US011620601B2

(12) United States Patent
Hampapur et al.

(10) Patent No.: US 11,620,601 B2
(45) Date of Patent: Apr. 4, 2023

(54) SYSTEM FOR ENTERPRISE VALUE OPTIMIZATION

(71) Applicant: Bloom Value Corporation, Norwalk, CT (US)

(72) Inventors: Arun Hampapur, Norwalk, CT (US); Sampoorna Hegde, Bengaluru (IN); Venu M. Kondle, West Sacramento, CA (US); Arvind Conjeevaram, Bangalore (IN)

(73) Assignee: Bloom Value Corporation, Norwalk, CT (US)

( * ) Notice: Subject to any disclaimer, the term of this patent is extended or adjusted under 35 U.S.C. 154(b) by 0 days.

(21) Appl. No.: 17/832,555

(22) Filed: Jun. 3, 2022

(65) Prior Publication Data
US 2022/0391815 A1    Dec. 8, 2022

(30) Foreign Application Priority Data
Jun. 5, 2021 (IN) .............................. 202141025041

(51) Int. Cl.
*G06Q 10/00* (2023.01)
*G06Q 10/0637* (2023.01)
(Continued)

(52) U.S. Cl.
CPC ....... *G06Q 10/06375* (2013.01); *G06Q 10/04* (2013.01); *G06Q 10/067* (2013.01);
(Continued)

(58) Field of Classification Search
CPC ............. G06Q 10/06375; G06Q 10/04; G06Q 10/067; G06Q 10/06393; G06Q 10/06; G06F 3/14; G06F 16/2458
(Continued)

(56) References Cited

U.S. PATENT DOCUMENTS 6,411,936 B1 * 6/2002 Sanders ............. G06Q 10/0639
705/7.29
9,130,860 B1 * 9/2015 Boe ........................ G06F 3/0484
(Continued)

FOREIGN PATENT DOCUMENTS

WO    WO-2017063092 A1 *  4/2017 ....... G06F 17/30327

*Primary Examiner* — Rutao Wu
*Assistant Examiner* — Tyrone E Singletary
(74) *Attorney, Agent, or Firm* — Kevin J Fournier IP Legal Services Ltd.; Kevin J Fournier

(57) ABSTRACT

A system and a method to optimize values delivered by an enterprise, are described. An integrated system may receive data from multiple data sources that may be processed by engines and/or models. The engines and/or models may execute operations or functions, such as data processing, analysis based on rules, automated learning, machine learning and transforming the data to create value graphs associated with processes, tasks, and/or services in the enterprise. The value graphs may be generated that may provision continuous monitoring and insights to measure of KPIs and other influencing factors that may be associated with the processes, and services in the enterprise. The integrated system may generate visualizations that may be rendered via user interfaces. Further based on the value graphs, stakeholders may be able to identify opportunities associated with processes, tasks, and/or services that may be actioned to drive employee engagement, and value of the enterprise.

20 Claims, 11 Drawing Sheets

(51) Int. Cl.
  *G06Q 10/067* (2023.01)
  *G06Q 10/04* (2023.01)
  *G06Q 10/0639* (2023.01)
  *G06Q 10/06* (2023.01)
  *G06F 16/2458* (2019.01)
  *G06F 3/14* (2006.01)

(52) U.S. Cl.
  CPC ......... *G06Q 10/06393* (2013.01); *G06F 3/14* (2013.01); *G06F 16/2458* (2019.01); *G06Q 10/06* (2013.01)

(58) Field of Classification Search
  USPC ........................................... 705/7.37
  See application file for complete search history.

(56) References Cited

U.S. PATENT DOCUMENTS

| | | | |
|---|---|---|---|
| 9,210,056 B1* | 12/2015 | Choudhary | H04L 69/329 |
| 10,832,181 B2* | 11/2020 | Nguyen | G06Q 10/06393 |
| 2008/0312979 A1* | 12/2008 | Lee | G06Q 10/0635 |
| | | | 705/7.39 |
| 2015/0081396 A1* | 3/2015 | Miller | G06F 16/24 |
| | | | 707/754 |
| 2017/0206592 A1* | 7/2017 | Chen | G06Q 30/0635 |
| 2018/0024901 A1* | 1/2018 | Tankersley | G06Q 10/06393 |
| | | | 707/694 |
| 2019/0171446 A1* | 6/2019 | Bryan | G06Q 10/06 |
| 2019/0378061 A1* | 12/2019 | Cao | G06N 3/08 |
| 2021/0200197 A1* | 7/2021 | Breyfogle, III | G05B 23/0232 |
| 2022/0067626 A1* | 3/2022 | Unnikrishnan | G06F 3/14 |

* cited by examiner

SYSTEM FOR ENTERPRISE VALUE OPTIMIZATION

CROSS REFERENCE TO RELATED APPLICATIONS/INCORPORATION BY REFERENCE

This application claims the priority benefit of an Indian Provisional Patent Application No. 202141025041, titled "ENTERPRISE VALUE OPTIMIZATION SYSTEM", filed on Jun. 5, 2021. The entirety of the above-mentioned patent application is hereby incorporated by reference and made a part of this specification.

FIELD

Various embodiments of the disclosure relate to recurrently optimizing values for an enterprise. More specifically, various embodiments of the disclosure relate to an integrated system that optimizes various metrics or values for the enterprise. The integrated system may receive, process, analyze, and transform data from various data sources into actionable insights that may aid, or support decision making to implement or modify processes in the enterprise thereby optimizing metrics or values for the enterprise.

BACKGROUND

New age organizations may include business units that may operate independently or co-dependently to achieve certain business objectives. However, when such new age organizations scale up progressively with time, managing co-dependent functions may be cumbersome, complex, time consuming and operationally inefficient. Further, data associated with the business units that may be related to co-dependent operations may be consumed by senior management to make strategic decisions to achieve the business objectives. Conventionally, such may be either be stored centrally or dispersed, for example, in spreadsheets by the respective business units. Such conventional practices may create silos and there will be a lack of visibility in the data to optimally manage the business units. The complexity increases with an increase in a number of tasks in each business unit.

The aforementioned practices that lead to complexities and silos in data management may negatively impact the service delivery capabilities and therefore the desired business objectives at an organizational level. Further, such a negative impact may yield lower return on investments (ROIs) due to misaligned information as the data is stored or managed through disparate systems, lack means for tracking of information due to the aforementioned storage techniques, lack means to track metrics and measure the performance of the business units at an organizational level, etc. Further negative impact may directly affect the end users, leading to a lower customer satisfaction levels, and a lower customer repeatability, thereby leading to driving a lower revenue generation. Identifying such co-dependencies and being able to measure the impact of changes in deliverables by business units that may affect an overall quality of service or product, may therefore be challenging.

The limitations and disadvantages of conventional and traditional approaches will become apparent to one of skill in the art, through comparison of described systems with some aspects of the present disclosure, as set forth in the remainder of the present application and with reference to the drawings.

SUMMARY

A system, a method, and non-transitory computer readable device for an integrated system that optimizes the value delivered by an enterprise, is described.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
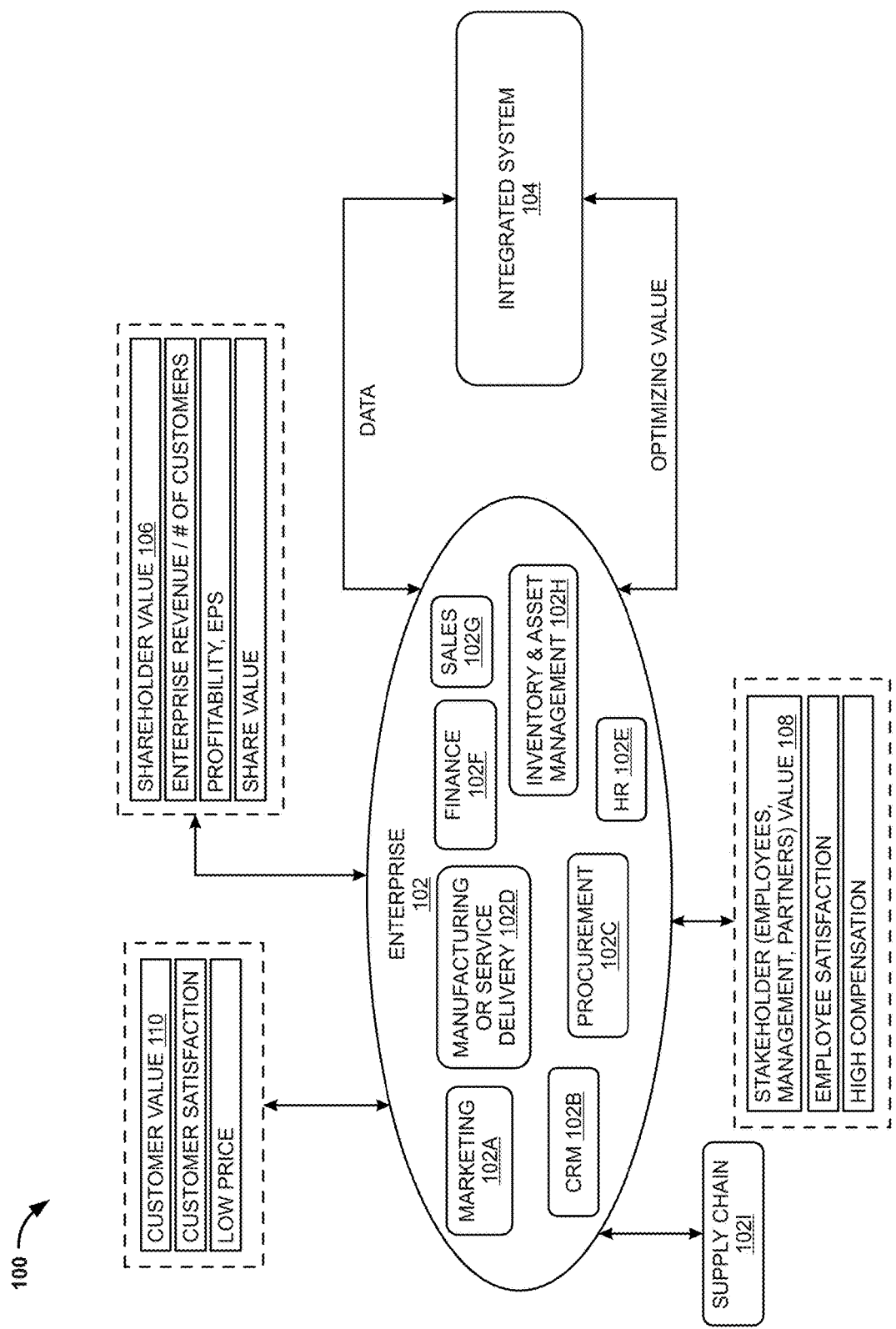
FIG. 1 is a block diagram showing an environment including an enterprise and an integrated system, according to an exemplary embodiment.

Embodiments of techniques related to a method, a system and a non-transitory computer readable device that implements an integrated system to optimize value delivered by an enterprise are, described herein.

In an embodiment, the subject specification describes a system that may also be referred to as an integrated system that is designed to be deployed or implemented in an enterprise. The integrated system described herein may provision simplified interface into insights that can aid making strategic decisions through engagement and actions that may optimize the value delivered by the enterprise.

In an embodiment, the integrated system may include multiple engines, models, and a framework that execute operations independently or in cooperation, to optimize the value delivered by an enterprise. The integrated system may be configured to receive data from multiple data sources. The received data may be processed and analyzed by the multiple engines, the models, and the framework. Based on the analysis, the integrated system may generate multiple value graphs that include a measure of a key performance indicator (KPI). For example, the KPIs may be associated with multiple processes, services, tasks, etc., that are delivered by the enterprise. The value graphs may include multiple connections and a corresponding weight for each connection. The multiple connections may represent multiple links between factors and corresponding parameters influencing the measure of KPIs. Based on the generated value graphs, the integrated system may be configured to determine multiple tasks and opportunities that may be optimized. Based on the determination, the stakeholders of the enterprise may optimize the determined tasks and opportunities that may drive value or improvise the value/quality of service/process/tasks delivered by the enterprise.

In an embodiment, the integrated system may provide and implement decision-based logics, multiple interfaces, engines and/or models, frameworks, one or more circuitries and/or code executable by the circuitries. The engines and/or models, frameworks, implemented by the integrated system may execute operations or functions, either independently or in cooperation. An engine may correspond to a special purpose program or an executable code that performs or executes one or more core functions or operations. Modelling may correspond to a mechanism or a process that includes creating or improvising a functional or operational aspect of a system or one or more feature of the system by referencing an existing or known knowledge base. The outcome of the modeling process is to simplify the functional or operational aspect of the system or one or more features of the system that can be easily understood, quantified, and visualized. The mechanism for modeling may be automated through a continual process of training the model with data from multiple sources. The engines and/or the models may implement an execution of the one or more core functions or operations based on configured one or more rules and/or one or more sequence of sequence of steps to produce specific outcomes. The engines and/or models may be configured to work either independently or in conjunction with one or more engines or one or more models.

FIG. 1 is a block diagram showing an environment including an enterprise 102 and an integrated system 104, according to an exemplary embodiment. FIG. 1 shows a block diagram that includes an environment 100 of an enterprise 102, and an integrated system 104. In an embodiment, the enterprise 102 may provide services in a specific sector or a domain. For example, such sector or domain may correspond to a retail domain, a hospital ecosystem, an academic institution, a travel and transportation sector, a finance sector, etc. Such enterprise 102 may implement different processes to provide products and/or services and generate revenue. The revenue generated may be measured by, for example, cash earnings, stocks, shares, earnings per share (EPS), customer growth, and earnings before interest, taxes, depreciation, and amortization (EBITDA). Over a period of time, a growth in the revenue leads to profits and an improvement in the financial performance of the enterprise, that accrues as a financial value to the shareholders and may represent a shareholder value 106.

In an embodiment, the enterprise 102 may include multiple factions that may work independently or co-dependently for providing the services and/or products. Such factions may further implement processes to ensure that there is an uninterrupted delivery in the services and/or the products. For instance, such multiple factions may include a marketing 102A faction, a customer relationship management (CRM) 102B faction, a procurement 102C faction, a manufacturing or service delivery 102D faction, a human resource (FIR) 102E faction, a finance 102F faction, a sales 102G faction, an inventory & asset management 102H faction, and a supply chain 102I faction. The operational performance of the enterprise 102 may be measured by the optimal functioning of the aforementioned factions leading to growth in revenue. Such operational performance may further be influenced or controlled by multiple interdependent factors within each faction. For example, the operational performance may be associated with either independent or interdependent factors that may include a measure of quality of product and/or service delivery and/or customer satisfaction, when the end users consume or use the product and/or service. The measure of quality of the product and/or service delivery may be dependent or based on multiple factors. For example, the measure of quality-of-service delivery may be based on factors, such as employee diligence and commitment to a delivery of specific service(s), an empathetic behavior of the employee, and an attention to details of the employee for delivering such services, etc.

In an embodiment, the service delivery management by the multiple factions (e.g., 102A, 102B, 102C, 102D, 102E, 102F and 102G) in the enterprise 102 may be managed by implementing and adhering to structured processes. The management of such structured processes and the measurement of quality of service delivery may further be dependent on parameters, such as instructions provided by supervisors or managers, and other personnel managing or implementing the specific processes in the enterprise 102. Such supervisors or managers, and other personnel may additionally be responsible for managing a delivery of other service(s) or execute or handle other tasks, that may need cooperation or coordination with one or more factions (e.g., 102A, 102B, 102C, 102D, 102E, 102F and 102G) in the enterprise 102.

In such a scenario, there is an interdependency or a codependency between the employees associated with various processes, tasks, and/or services of the different factions (e.g., 102A, 102B, 102C, 102D, 102E, 102F and 102G) in the enterprise 102. The measure of quality of service delivery may directly impact or influence the objectives of the enterprise 102. For instance, when the quality-of-service delivery meets or exceeds expectations, the enterprise 102 may experience an upward trend in growth of the enterprise 102. The upward trend may correspond to an increase in revenue generation, an increase in level of customer satisfaction, an increase in a measure of business repeatability through customer repeatability, etc. When quality of service delivery is managed diligently, it may positively impact the growth in the revenue and cash flow for the enterprise 102. Over a period of time, an increase in the revenue may lead to profits and a further improvement in the financial performance of the enterprise 102, that accrues financial value that can propel an increase in employee compensation. The employees may represent as stakeholders for the enterprise 102 and the increase in the compensation of the employees improves the employee engagement leading to a higher employee satisfaction. Such employee satisfaction may be represented by, for example, a stakeholder value 108.

In an embodiment, the measure of customer satisfaction consuming or using the product and/or service may be based on multiple factors. For example, such factors may include an awareness level of the product and/or service and the customer experience upon consumption or use of the product and/or service. Such factors influencing or contributing to the measure of the customer satisfaction may directly impact the revenue or the earnings of the enterprise 102. For instance, a positive measure of the customer experience or the customer satisfaction may yield to an increase in the revenue driven by end user behaviors, such as customer repeatability, recommendations through word of mouth, realization that the enterprise 102 is empathetic and pays attention to customer feedbacks, etc. Over a period of time, an increase in the revenue may lead to profits and an improvement in the financial performance of the enterprise, thereby accruing recognition or brand value of the enterprise 102. The brand value increases credibility, and business repeatability resulting in an improvement in the customer satisfaction and may be represented by, for example, a customer value 110.

In an embodiment, the integrated system 104 may include multiple engines (not shown) and/or models (not shown) that may execute functions or operations, either independently or in cooperation, to provide insights into the processes of the factions (e.g., 102A, 102B, 102C, 102D, 102E, 102F and 102G) in the enterprise 102. Such insights may be devised into actions that may be implemented for optimizing or increasing the delivery value for the enterprise 102. For example, the engines and/or models in the integrated system 104 may execute operations related to an enterprise modeling, a predictive analysis modeling, a data de-identification and anonymization engine or model, a data analytics and visualization engine or model that provides insights through insights on key performance indicators associated with processes, tasks, and/or services, an automated learning engine or model, a data transformation engine or model, an augmented data or inputs from subject matter experts (SMEs) with automated engines and machine learning engines, generating data analytics and visualizations, creating value graphs, identifying tasks, processes, functions, metrics and opportunities for maximizing value through automated and manual optimization, analyzing process metrics, and tracking engagements and actions to drive value. The aforementioned execution of operations or functions by the integrated system 104 may provide insights to various shareholders and/or stakeholders in the enterprise 102. Such insights may aid or help the shareholders and/or stakeholders to make strategic decisions that can drive value and contribute to the growth of the enterprise 102. Such strategic decisions may aid driving actions that may optimize or maximize the overall value delivered by the enterprise 102.

Figure 2:
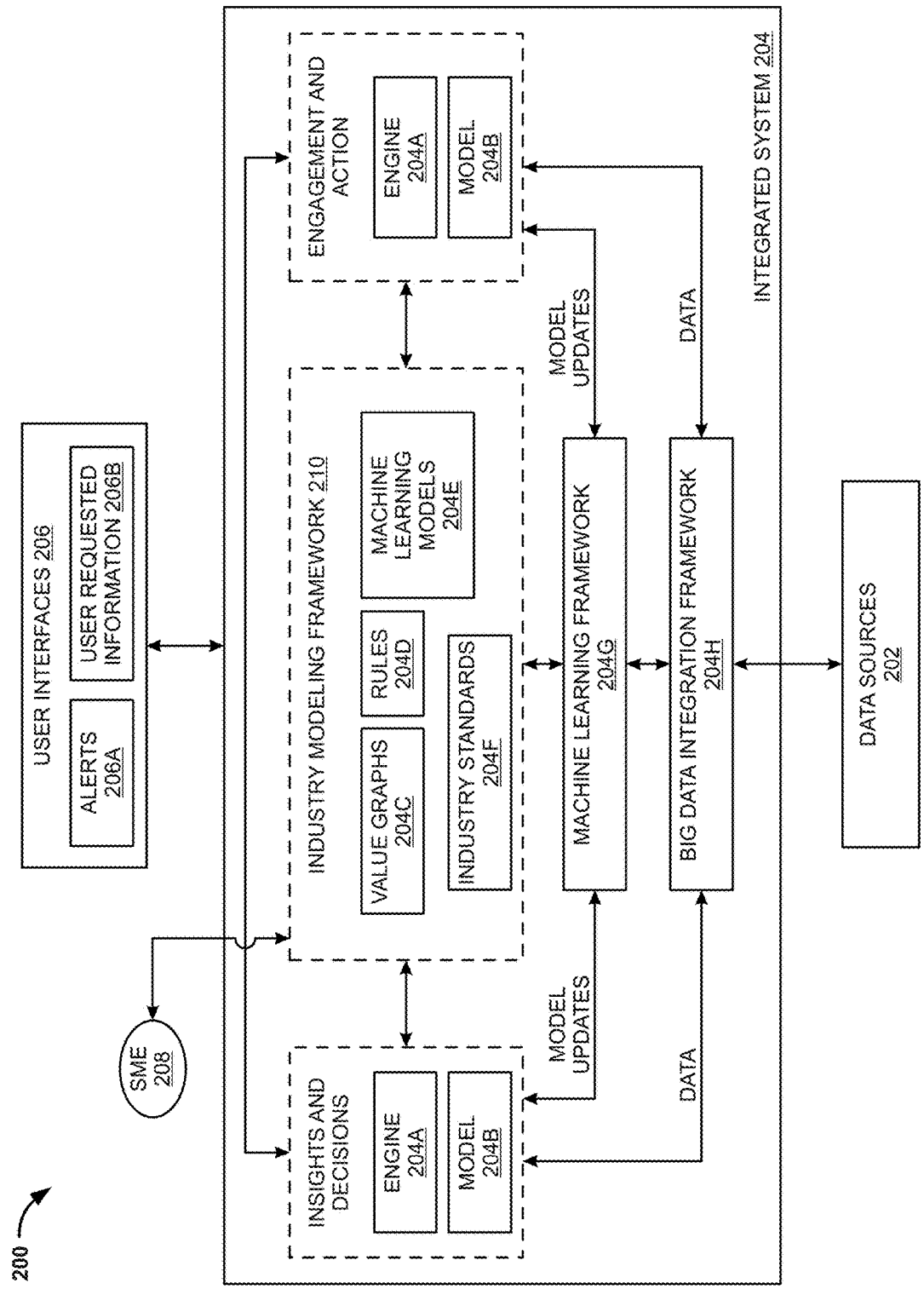
FIG. 2 is a block diagram showing an environment for optimizing values of an enterprise, according to an exemplary embodiment.

FIG. 2 is a block diagram showing an environment 200 for optimizing values of an enterprise, according to an exemplary embodiment. FIG. 2 is described in conjunction with FIG. 1. FIG. 2 shows an environment 200 including data sources 202, an integrated system 204, and user interfaces 206. The data sources 202 may store information from multiple sources. For example, when the enterprise 102 represents the hospital ecosystem, the data sources 202 may include data or information related to a hospital information system (HIS), an enterprise resource planning (ERP) system, a financial management system, etc.

In an embodiment, the integrated system 204 may include a machine learning framework 204G, a big data integration framework 204H, an industry modeling framework 210, engine 204A and model 204B that provide insights, help in making decisions, drive engagement and actions. The big data integration framework 204H may be configured to receive the data from the data sources 202, the engines (e.g., 204A) and the models (e.g., 204B) and execute operations or functions to process the received data from the data sources 202. The machine learning framework 204G may work in cooperation with the big data integration framework 204H. The machine learning framework 204G may work in cooperation with engine (e.g., 204A) and/models (e.g., 204B) and may be configured to execute operations such as recurrently learning the data, the data patterns and modifications in the data and training the models (e.g., 204B) based on the changes and/or modifications in the data, the data patterns, and the information from the external sources. The machine learning framework 204G may further work in cooperation with the industry modeling framework 210 and receive data from external sources. For example, such external sources may include inputs and recommendations from subject matter experts (SMEs) 208. In an embodiment, the integrated system 204 may include the industry modelling framework 210 that may implement models, standards, rules, etc., to model the enterprise 102. The industry modeling framework 210 may implement, for example, value graphs 204C, rules 204D, machine learning models 204E, and an industry standards 204F. The industry modeling framework 210 may be configured to receive inputs from external sources, such as the SMEs 208 and the machine learning models 204E may be trained using multiple sources on information and data sources 202. In an embodiment, the machine learning models 204E may be trained to augment suggestions and recommendations from SMEs 208 with the data from the machine learning framework 204G and provision insights corresponding to each process and/or service in the enterprise 102.

In an embodiment, the user interfaces (UIs) 206 may display information in response to the execution of the functions or the operations by the components (e.g., 204A, 204B, 204C, 204D, 204E, 204F, 204G and 204H) in the integrated system 204. The UIs 206 may provision displaying the information such as alerts 206A, and any user requested information 206B. The UIs 206 may be accessible via universal resource locators (URLs) or via instantiation of applications on portable devices or any electronic devices. The portable devices and/or electronic devices may include, for example, mobile devices, personal digital assistants, electronic handheld devices, laptops, computer devices, etc. The information may be displayed on the UIs 206 via dashboards, mobiles apps, etc. The response or results of the execution of the engine and/or model in the integrated system 204 may provide insights to information including process and/or performance metrics that may be displayed on dashboards. The insights to information displayed may be associated with each implemented process and/or each service provided by the enterprise.

In an embodiment, the integrated system 204 may provision generating and sending alerts and/or notifications to end users based on certain attributes of the end user. For example, such attributes may be related to a role, a position, and one or more responsibilities held by an individual in the enterprise 102. The mechanism of generating and sending alerts based on the aforementioned attributes by the integrated system 204 may facilitate proactive engagement of various stakeholders and shareholders. Further, proactive engagement may provision insights into information and data that may provide opportunities for optimizing the metrics or the values driving the enterprise 102. Based on the role of each stakeholder and/or shareholder, the integrated system 204 may be configured to filter and display specific information on the dashboards or the UIs 206. Further, the end users, such stakeholders and/or shareholders may request for specific information related to the KPIs associated with the processes, tasks, and/or services in the enterprise 102. Such information may be used for identifying opportunities associated with one or more processes, tasks, and/or services that may be optimized or maximized to improve the overall value delivered by the enterprise 102.

Figure 3:
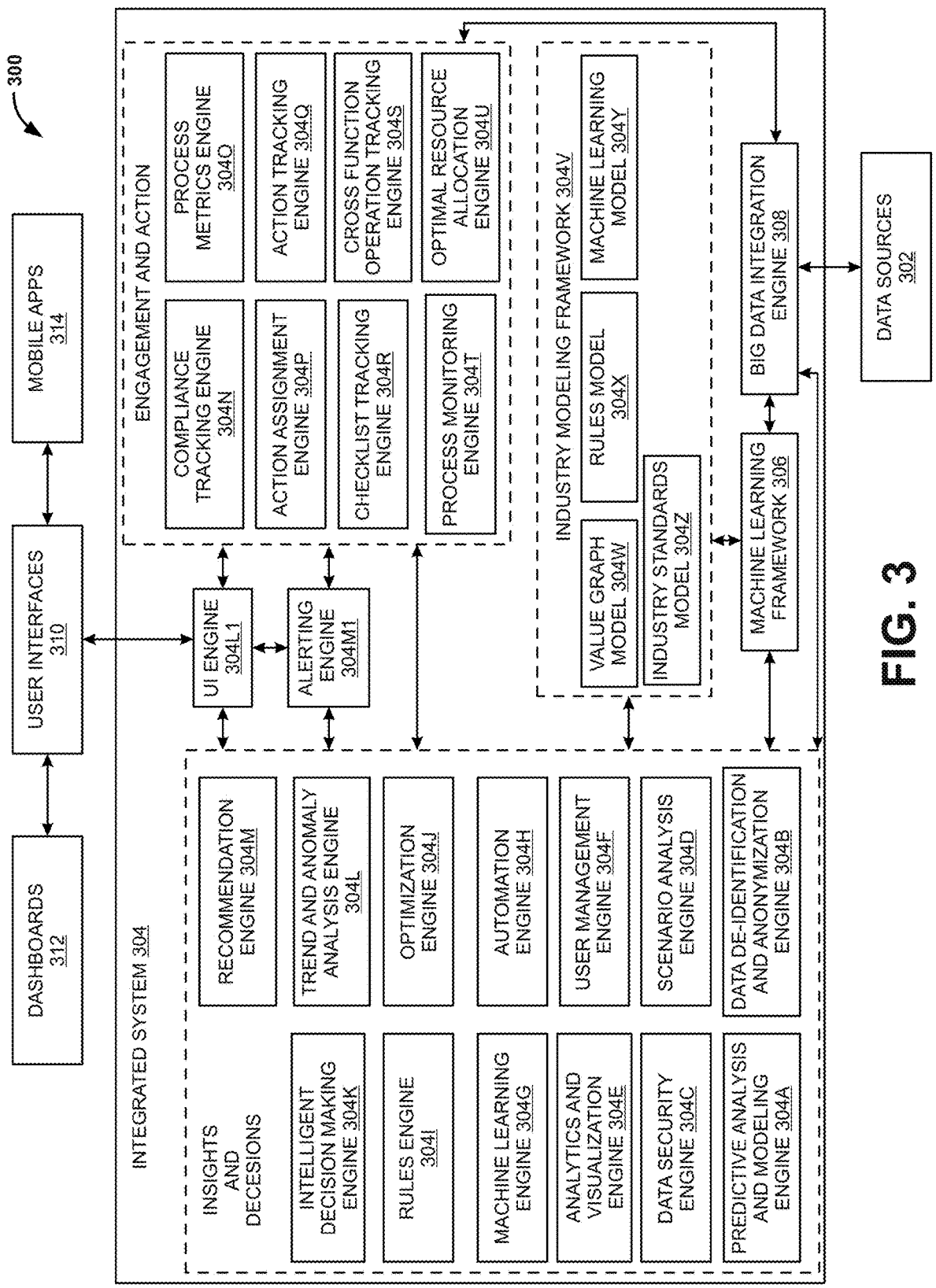
FIG. 3 is a block diagram showing a system for optimizing values of an enterprise, according to an exemplary embodiment.

FIG. 3 is a block diagram showing a system 300 for optimizing values of an enterprise, according to an exemplary embodiment. FIG. 3 is described in conjunction with FIG. 2 and FIG. 1. FIG. 3 shows a system 300 that includes data sources 302, an integrated system 304, UIs 310, dashboards 312 and mobile apps 314. In an embodiment, the integrated system 304 may implement suitable logic, circuitry, interfaces and/or code executable by the circuitry and is operable to execute multiple operations, either independently or in cooperation with one or more engines or one or more models.

In an embodiment, the engines and/or models may include, for example, a predictive analysis and modeling engine 304A, a data de-identification and anonymization engine 304B, a data security engine 304C, a scenario analysis engine 304D, an analytics and visualization engine 304E, a user management engine 304F, a machine learning engine 304G, an automation engine 304H, a rules engine 304I, an optimization engine 304J, an intelligent decision making engine 304K, a recommendation engine 304M, a user interface (UI) engine 304L1, an alerting engine 304M1 etc. The engines (e.g., 304A, 304B, 304C, 304D, 304E, 304F, 304G, 304H, 304I, 304J, 304K, 304L and 304M) may execute operations or functions and provide generating "insights" that may support making strategic "decisions" at the enterprise 102 level.

In an embodiment, the engines and/or models may further include a compliance tracking engine 304N, a process metrics engine 304O, an action assignment engine 304P, an action tracking engine 304Q, a checklist tracking engine 304R, a cross-function operations tracking engine 304S, a process monitoring engine 304T, and an optimal resource allocation engine 304U. The engines (e.g., 304M, 304N, 304O, 304P, 304Q, 304R, 304S, 304T and 304U) may execute operations or functions that may provide identifying opportunities for "engagement" and drive "actions."

In an embodiment, the integrated system 304 may include an industry modelling framework 304V that may be used to model the enterprise 102. The industry modeling framework 304V may use multiple sources of inputs and information from the repositories for modeling the enterprise 102. For example, such multiple sources of inputs and information from the repositories may include a value graph model 304W, a rules model 304X, a machine learning model 304Y, and an industry standards model 304Z. The machine learning model 304Y may be trained in real time from multiple sources of information generated from the value graph model 304W, the rules model 304X, and the industry standards model 304Z.

In an embodiment, the rules model 304X may be either configured manually or automatically based on multiple sources of inputs and information from the repositories. For example, the rules model 304X may be trained to instantiate an action based on an occurrence of an event or a threshold value. For example, threshold value at which a particular action must be instantiated may be based on variation in the KPI associated with the tasks, processes, operations and/or services. The threshold value or the type of event may be different based on the type of enterprise 102 and processes, tasks, and/or services in the enterprise. Such information may be used for training the models in the industry modeling framework 304V that may automate the process or mechanism of training, modifying and/or updating the rules and/or sequence of steps producing specific outcomes. Such real time training of the models (e.g., 304W, 304X, 304Y and 304Z) in the industry modeling framework 304V may automate modeling of the enterprise 102, as described above.

In an embodiment, the data sources 302 may include multiple sources of information associated with the hospital ecosystem. For example, the data sources 302 may include information that may be assimilated from the hospital information system (HIS), the enterprise resource planning (ERP) system, the financial management system, etc. The data associated with the HIS system may include information or the data associated with a patient engagement and management, a hospital capacity planning, a hospital material management, a medical procedure planning, a laboratory management, a provider engagement, an operation theatre (OT) management, a biomedical management, a clinical management, a revenue management, a facilities management, a remote patient/provider data, medication related information, an in-patient journey, a consultant journey, a remote patient healthcare journey, other services related information associated with the HIS. The data associated with the ERP system may include information associated with services or functions, such as a human resources planning, a customer relationship management, a project management, a supply chain management, finance, etc. The data associated with the financial management system may include information associated with the financial transactions, a department wise revenue, a pricing information associated with the medical procedures, pricing/spend data, a hospital financial structure and models, and a revenue generated representing financial information of the enterprise 102.

In an embodiment, the integrated system 304 may include the machine learning framework 306 and the big data integration engine 308. The big data integration engine 308 may be configured to receive the data from the data sources 302 and process the received data. The big data integration engine 308 may be configured to work in cooperation with the engines in the integrated system 304 to execute operations such as data normalization, data anonymization, data aggregation, data analysis and data storage for future use. In an embodiment the big data integration engine in cooperation with the other engines in the integrated system 304 may execute operations to perform big data analytics. The machine learning framework 306 may work in cooperation with the engines, the framework, and the models in the integrated system 304.

In an embodiment, the machine learning framework 306 may be configured to execute operations such as continually learning from the data and modifications in the data and training the models based on such data and information from external sources. For example, such external sources may include inputs and recommendations from subject matter experts (SMEs). The big data integration engine 308 may receive the data in different data formats and process it. The big data integration engine 308 may execute operations for normalizing and integrating the data that may be further processed, analyzed, and transformed by the engines and/or the models in the integrated system 304.

In an embodiment, the predictive analysis and modeling engine 304A may execute operations to perform predictive analytics on the data. The predictive analytics may correspond to different situations or scenarios in the enterprise 102. The data de-identification and anonymization engine 304B may execute operations to de-identify and anonymize the data associated with the users. All sensitive information and unique identifiers associated with the users may be de-identified and anonymized to protect the user privacy and confidentiality. The data security engine 304C may execute operations to encrypt the data. The encrypted data may be managed and shared for processing, execution of specific functions or operations, perform analysis, transform the data into visualizations, etc., by the engines (e.g., 304A through 304M, 304M1, 304L1, 304N through 304U) in the integrated system 304.

In an embodiment, the scenario analysis engine 304D may be configured to execute operations to provision analyzing different scenarios via the dashboards 312 or UI's 310. The scenario analysis engine 304D may present the user with multiple solutions or options, such that the user can perform a "WHAT-IF" analysis across multiple options, independent and combination of different solutions or scenarios. The analytics and visualization engine 304E may be configured to execute operations to perform data analysis in cooperation with the predictive analysis and modeling engine 304A.

Based on the data analysis, the analytics and visualization engine 304E may execute operations to generate visualizations and provide multidimensional insights into the data. The user management engine 304F may execute operations to manage the users based on their roles. For instance, the user management engine 304F may be configured to manage the user profiles and provide access to information and appropriate rights. For example, a subset of the data may be kept confidential to enable privacy and security and the access rights to such information may be managed by the user management engine 304F.

In an embodiment, the machine learning engine 304G may be configured to continually learn the data patterns, the modifications in the data patterns, augment with information or data provided by subject matter experts (SME) and cooperatively work with the engines and the models in the integrated system 304. The automation engine 304H may be configured to execute operations of determination and automating certain user actions and tasks. The automation engine 304H may work in cooperation with the user management engine 304F to make such determinations and automate the execution of user actions and tasks. The rules engine 304I may be configured with multiple rules that may encode operating processes, rules and procedures associated with the operations, functioning and management of the hospital ecosystem. The optimization engine 304J may be configured to execute operations for determining or identifying the opportunities or tasks or metrics that may be optimized.

In an embodiment, the intelligent decision making engine 304K may be configured to execute operations to generate information that can help or aid making decisions. The intelligent decision making engine 304K may work in cooperation with other engines to execute operations like providing recommendations, aiding decision making based on specific scenarios, etc. The trend and anomaly analysis engine 304L may execute operations to perform a root cause analysis. The trend and anomaly analysis engine 304L engine may cooperatively work with engines to determine and analyze trends based on historic information or data, determine, and analyze anomalies in the processes of different functions or units in the hospital, determine and analyze demand for certain services, determine and analyze trends of occupancy of beds, patient in-flow and out-flow, specific seasonal or situation-based analysis. The recommendation engine 304M may be configured to execute operations related to make recommendations based on analysis by the other engines (e.g., 304D, 304K, 304L, etc.). The recommendations provided may provision further insights and aid making strategic decisions by the stakeholders.

In an embodiment, the compliance tracking engine 304N may be configured to execute operations of determining adhere or violations of compliance associated with the hospital operations. For instance, the compliance tracking engine 304N may provision insights if any changes or modifications implemented may impact the compliance related aspects in the enterprise 102. The process metrics engine 304O may be configured to execute operations for computing, tracking, and measuring metrics associated with various functions or operations in the enterprise 102. For instance, the metrics may be associated with specific tasks, processes, etc., in the enterprise 102. The action assignment engine 304P may be configured to execute operations related to assigning or implementing actions to various stakeholders or employees in the enterprise 102. The action tracking engine 304Q may be configured to execute operations for tracking the assigned or implemented actions. The checklist tracking engine 304R may be configured to execute operations of generating a checklist of employees and their assigned tasks. In case of any reshuffling or additional assignment of tasks, the checklist tracking engine 304R may be configured to provide insight into changes and the orientation of the corresponding changes.

In an embodiment, the cross function operation tracking engine 304S may be configured to execute operations of tracking information related to staff or employee on account of reshuffling between different factions or units or departments. The cross function operation tracking engine 304S may be configured to determine interdependency or a codependency between the employees associated with various processes, tasks, and/or services of the different factions or units or departments. The process monitoring engine 304T may be configured to execute operations of tracking processes, determining impact on processes due to changes or shuffling or employees or staff, providing insights and information on processes, etc. The optimal resource allocation engine 304U may be configured to execute operations of determining and allocating optimum number of resources, for example, employees or staff, to specific processes or departments or units. Such optimum allocation ensures that the operations or functions associated with the processes or the departments or the units are not impacted.

In an embodiment, the trend and anomaly analysis engine 304L may be configured to execute operations to detect trends and underlying anomalies associated with a specific process in the enterprise 102. For example, the processes in the enterprise 102 may include a supply chain management process (e.g., a demand and supply related activities), an expenditures or costs related process, a revenue generation process, measuring service quality process, measuring customer service process, measuring customer satisfaction process, etc. Based on the type of process, the trend and anomaly analysis engine 304L may be trained to detect corresponding anomalies in the processes. The trend and anomaly analysis engine 304L may work in cooperation with the recommendation engine 304M to provide recommendations for remediating the anomalies.

In an embodiment, the alerting engine 304M1 may work in cooperation with the UI engine 304L1 to generate notifications and provide alerts to the stakeholders and/or shareholders. The optimization engine 304J may work in cooperation with the automation engine 304H, and the machine learning engine 304G, to execute operations to determine various metrics and identify opportunities that may be optimized. For example, when the enterprise 102 is associated with a retail industry related to fast moving consumer goods (FMCGs), the optimization engine 304J may be configured to determine opportunities that may be related to an inventory availability, a number of reorders of specific goods, etc., that may be optimized. The optimization engine 304J may work in cooperation with the optimal resource allocation engine 304T to determine an optimal allocation of the resources for executing the specific operations or functions.

In an embodiment, the process monitoring engine 304T may be configured to create processes by various stakeholders in the enterprise 102, monitor the created processes and process logs, monitor a turnaround time for executing specific tasks associated with the processes, compliance of the process requirements, create, and manage checklists associated with the processes, create, and manage action items for supervisors, managers, and other stakeholders in the enterprise 102. Further the process monitoring engine 304T may be configured to work in cooperation with the alerting engine 304M1 to generate notifications and send alerts based on the stakeholder role. Such a mechanism of cooperative working provides user-based messaging, so that the stakeholders are notified of the actions that are pending or matters that need immediate attention and addressing.

In an embodiment, the engines (e.g., 304A through 304U) and the industry modeling framework 304V may implement suitable logic, interfaces, one or more circuitries and/or code executable by the circuitries to execute operations, for example, modeling the enterprise 102. For example, the enterprise modeling in healthcare or hospital ecosystem, may include identifying data associated with each of the processes, tasks, and/or services provided by specific departments, units, factions, or wards. Upon identification, the integrated system 304 may execute operations, such as training the engines for modeling the hospital ecosystem. For example, the modeled enterprise may be refined by augmenting an external information or knowledge of subject matter experts (SMEs), information from multiple HIS systems, ERP systems, etc. Such enterprise modeling may be dynamic and continuously changing based on attributes and parameters of the processes, tasks, and/or services in the hospital ecosystem. Further, the engines (e.g., 304A through 304U) may implement suitable logic, interfaces, one or more circuitries and/or code executable by the circuitries, to execute operations, such as creating or generating value graphs and process metrics. Such value graphs and process metrics may be generated based on a continual learning of information and data by the machine learning engine 304G in the integrated system 304. Further, the value graphs and process metrics may be continually modified or optimized by augmenting external data, such as SME knowledge and information assimilated through automated machine learning engines. The creation, modification and optimization of the value graphs is dynamic and continually changes based on constantly changing attributes and parameters associated with the processes, tasks, and/or services provided by the hospital.

Further, the engines or models (e.g., 304A through 304U) may execute operations, such as identifying opportunities in the processes, tasks, and/or services that may be optimized. Such identification of opportunities may include using information represented by data analytics based on an execution of the operations by the engine, for example, analytics and visualization engine 304E. The mechanism for identifying opportunities in the processes, tasks, and/or services that may be optimized, may further include an augmenting insights of management driven strategic goals, external sources of information, such as SME knowledge and information learnt by automation engine 304H, machine learning engine 304G, etc. Further, such identification of the opportunities in the processes, tasks, and/or services may provide data driven insights and provide analysis using "what-if" approach. This may enable or support making strategic decisions by the stakeholders and/or shareholders. Further, the engines (e.g., 304A through 304U) may to execute operations, such as engaging with the respective stakeholders in the enterprise and recommend and monitor actions that may optimize or maximize driving value. For example, the engines (e.g., 304M through 304U) may enable tracking activities, tracking pending actions and making suitable recommendations that are actionable based on such tracked information. Such an arrangement of tracking information and making recommendations that are actionable enables closed loop monitoring of the processes, tasks, and/or services in the hospital. The closed loop monitoring may propel initiatives that transform "data driven insights" into "actions that drive value". Further, the closed loop metrics tracking may provision assimilation and tracking process and/or performance metrics that drive value across the various processes, tasks, and/or services in the hospital.

In an embodiment, the UI engine 304L1 in the integrated system 304 may work in cooperation with the engines (e.g., 304A through 304U). The UI engine 304L1 may provision generation and rendering visualizations via the dashboards 312 and mobile applications 314. The rendered visualizations may be customized based on the role of the stakeholders and shareholders in the hospital. In an embodiment, the generated visualizations may provision insights into processes, tasks, and/or services via value graphs. For instance, the value graphs may be created or generated by the integrated system 304 that provision insights that may be drilled down at a granular level and provide deeper insights to the metrics driving the processes, tasks, and/or services in the hospital. The value graphs may provide insights into the processes, tasks, and/or services that may be consumed by the stakeholders or shareholders. For example, the value graphs may be drilled down based on each task within a process and/or service or based on the employee that are associated with the specific processes, tasks, and/or services. The value graphs may provide further insights on the interconnections between the different processes and the respective stakeholders responsible for managing the different processes and delivery of the services at the hospital.

In an embodiment, the value graphs may provision insights to improve the quality of delivery of the processes, tasks, and/or services. The value graphs may be generated based on the analysis by the engines and/or models in the integrated system 304. Further the value graphs may be improvised via an augmentation of hybrid learning of information including information from automation leaning 304H, machine learning engine 304G, and knowledge of SMEs that may enable refining the insights. Further tracking of the actions across various stakeholders may provision closed loop feedback from data driven insights to actions that may optimize or increase driven value. The closed loop feedback may also be referred to as closed loop metric tracking that provides insights to metrics associated with the processes and/or service delivery.

For example, consider a hospital ecosystem that includes a 300 bed in-patient admission facility with a tertiary care and a broad range of specialties. Now let us a scenario where the nursing staff associated with a step-down ICU service may be overloaded with work that may be impacting or affecting an overall operations or functioning of the hospital ecosystem. Considering this scenario, the chief officer of nursing staff may foresee an attrition and may approach the chief medical officer (CMO) with an information foresight. The chief office of the nursing staff may propose and formally request an approval for hiring additional nursing staff and/or an increase in pay of the existing nursing staff and/or seek suggestions or inputs to manage the situation that may eventually lead to attrition. In such a scenario, the CMO may coordinate with other stakeholders and senior leadership team of the hospital ecosystem and launch an initiative or a project with real time business impact measurement and tracking.

To measure the real time business impact and track the overall functioning of the hospital ecosystem, consider that the hospital ecosystem implements the integrated system 304. Upon embodiment, the integrated system 304, via the UI's 310 and dashboards 312 may provision insights into various parameters or aspects, such as the associated staff, expenditures, salaries, skills, schedules, demographic information, demand forecast, etc., associated with various processes, services, units, tasks, departments, factions, etc., in the hospital ecosystem. Upon gaining such insights, the CMO and/or senior leadership team may analyze the insights that may optimize functioning (e.g., optimize the value) of an intensive care unit (ICU) services and further the overall functioning of the hospital.

In an embodiment, the integrated system 304 may facilitate independent or cooperative execution of the operations or the functions by the engines, and the framework (e.g., 304V). The big data integration engine 308 in cooperation with the machine learning framework 306 and the engines related to insights and decisions (e.g., 304A, 304B, 304C, 304D, 304E, 304F, 304G, 304H, 304I, 304J, 304K, 304L, and 304M), the engines related to engagement and action (e.g., 304N, 304O, 304P, 304Q, 304R, 304S, 304T, and 304U), the models related to the industry modeling framework 304V (e.g., 304W, 304X, 304Y and 304Z) may execute operations to determine identifying opportunities, tasks, situations, scenarios, etc., that may be optimized (e.g., maximized, improvised, modified, etc.,) to drive value for the enterprise 102.

In an embodiment, the big data integration engine 308 in cooperation with the machine learning framework 306, the machine learning engine 304G and the trend and anomaly analysis engine 304L may execute operations to perform a root cause analysis (RCA) that may prospectively affect the efficient functioning of the hospital. This may include manually creating the value graphs based on the available data and information. The value graph may further provide insights into planning, analyzing different scenarios, making predictions based on such analysis, computation metrics, tracking engagements of the stakeholders and driving actions to maximize the KPIs and value delivered by the enterprise. In an embodiment, the aforementioned RCA may include determining the root cause for overloading of the step-down ICU. The engines (e.g., 304G, 304L, 306, and 308) and may execute operations to determine patterns of historic data corresponding to in-flow and out-flow of the patients from the ICU. Based on such determination, the engines (e.g., 304G, 304L, 306, and 308) and may be able to execute operations to analyze whether demand of services related to ICU are trending up or trending down. Further, the engines (e.g., 304G, 304L, 306, and 308) may execute operations to determine if there are any anomalies in the patterns of patient flow (e.g., in-flow and out-flow).

In an embodiment, the big data integration engine 308 in cooperation with the machine learning framework 306, the predictive analysis and modeling engine 304A, the analytics and visualization engine 304E, and the trend and anomaly analysis engine 304L may execute operations to determine and perform demand analysis and forecasting. For instance, such demand analysis and forecasting may include analyzing and forecasting of demand for ICU services or step down in ICU services for a specific period of time, for example, a remainder of the year, a first quarter of the next year, and so forth. The engines (304A, 304E, 304L, 306 and 308) may further execute operations to determine a patient demand and corresponding reasons for the step-down in ICU services. The engines (304A, 304E, 304L, 306 and 308) may further execute operations to determine a spike in demand or a trend and stability in demand that may be driven by, for example, ongoing market conditions such as a pandemic, seasonal changes, etc. The engines may further execute operations to determine initiatives taken to drive patient engagement and marketing programs implemented by the hospital ecosystem that may be positively or negatively influencing the ICU services demand.

In an embodiment, the big data integration engine 308 in cooperation with the machine learning framework 306, the scenario analysis engine 304D, the intelligent decision making engine 304K, the recommendation engine 304M and the optimization engine 304J may be configured to execute operations and provide solutions that may optimize the functioning of the ICU services. For instance, the engines (304D, 304J, 304K, 304M, 306 and 308) may execute operations to determine whether increasing hospital staff (e.g., nursing, ICU care, etc.) through external hiring may optimize the functioning and management of the ICU services. The engines (304D, 304J, 304K, 304M, 306 and 308) may execute operations and determine and provide insights into whether redirecting increased/overflow of patients to other hospitals or continue operating with status quo may be effective in optimizing the functioning and management of the ICU services. Further, the engines (304D, 304J, 304K, 304M, 306 and 308) may execute operations to determine and provide insights into whether temporarily shuffling staff from other factions or units in the hospital ecosystem may be effective in optimizing the functioning and management of the step-down ICU services. 100611 In an embodiment, the big data integration engine 308 in cooperation with the machine learning framework 306, the predictive analysis and modeling engine 304A, and the analytics and visualization engine 304E may be configured to execute operations and provide solutions or opportunities for a deeper level analysis. For instance, such deeper level analysis may be performed by analyzing information based on insights/ solutions, as described previously, leading to prospective questions. For example, such prospective questions may include "What is the projected impact on the staffing shortage and employee morale?" "What is the projected impact of this solution on other units in the hospital?"; "How is this expense going to impact the margin this year?"; "What is the impact on patient outcome from this solution?"; "What is the projected future revenue gain from this solution?"; "What additional expenditure is needed to ensure the future revenue gain from this solution?"; "What is the impact of the solution on current revenue?". In an embodiment, the analytics and visualization engine 304E in cooperation with the other engines (e.g., 304A, 306 and 308) may provide insights/ information to such aforementioned prospective questions.

In an embodiment, the big data integration engine 308 in cooperation with the machine learning framework 306, and the scenario analysis engine 304D may be configured to execute operations to capture key points that may influence making further decisions and drive engagement and actions. For instance, the above-described solutions and insights may be provided via the UI's 310 and the dashboards 312 that may be consumed by a selected stakeholders or senior leadership team of the hospital ecosystem. Based on the solutions and the insights, one or more parameters/actions that may drive optimizing or increasing the quality of engagement may be determined. For example, such parameters or actions may include determining an increase in the number of hospital staff such that the hospital staff are neither overburdened nor underutilized. Such determinations may provide further insights that may propel assigning specific actions to senior hospital staff and their respective teams to execute the identified solutions. Further insights and solutions may facilitate the leadership team or the stakeholders of the hospital ecosystem to propose and set hiring budgets, hiring timelines, etc., so that functioning of the ICU services and hence the overall functioning of the hospital may be optimized or improved.

In an embodiment, the big data integration engine 308 in cooperation with the machine learning framework 306, the action assignment engine 304P, the progress metrics engine 304Q, the checklist tracking engine 304R, the process monitoring engine 304T and the optimal resource tracking engine 304U may execute operations initiate engagement and drive actions. For instance, the engine (e.g., 304Q) may execute operations to determine the key performance indicators (KPI's) that may be associated with a measure of a situation in the step-down operations in the ICU. Further the engine (e.g., 304Q) may execute operations to determine KPI's that may be associated with a measure of the situation in other units, such as an orthopedic unit or a pediatric unit. Further, the engine (e.g., 304P) may execute operations to determine how and/or who may initiate the planning of actions, plan the shuffle of the hospital staff between the units, etc. The engine (e.g., 304Q) may execute operations to determine how planned actions may be implemented and communicated with the respective hospital staff. For example, this may include determining how to determine and implement changes in the hospital staff, communicate with and provide orientation to the reshuffled hospital staff, etc. The engine (304Q) may execute operations to drive the planned operations into action by implementing the planned changes, reshuffling of the hospital staff, etc. The engine (e.g., 304T) may execute operations to determine an impact of the planned actions, determine an improvement in metrics related to ICU step-down functions, determine an impact on the reshuffled units (e.g., orthopedic and/or pediatric units), determine an impact in overall functioning and a corresponding financial position of the hospital ecosystem, determine when the hospital staff must plan to return to their respective units (e.g., pediatric, or orthopedic), etc. The engine (e.g., 304N) may execute operations for tracking an impact on compliance of processes or procedures in different units (e.g., pediatric and/or orthopedic). In an embodiment, the aforementioned engines may execute operations to provide insights into processes and opportunities that may be optimized to drive improvement in the value and the performance of the hospital ecosystem.

Figure 4:
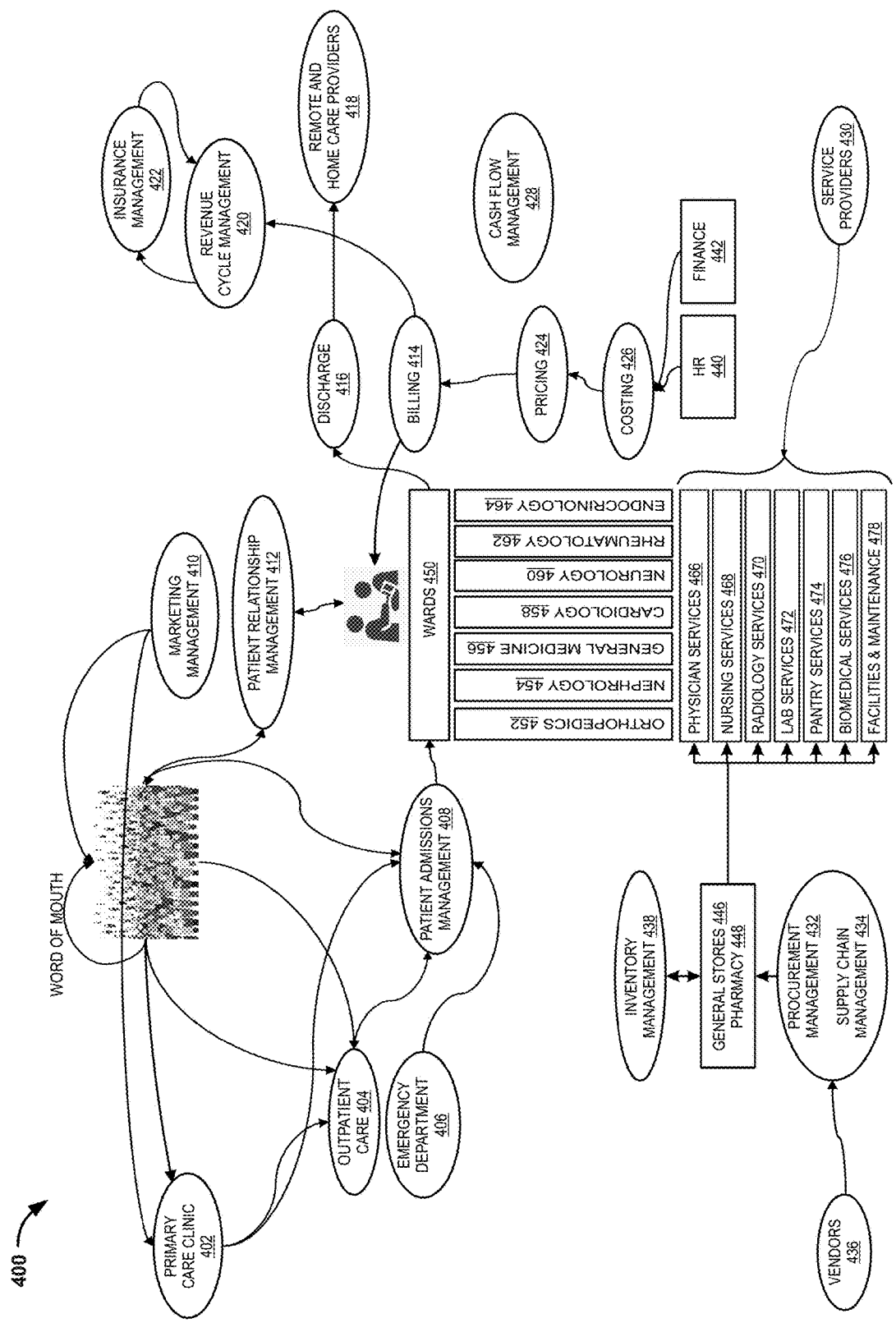
FIG. 4 is a block diagram showing an environment including an enterprise with processes, tasks, and/or services, according to an exemplary embodiment.

FIG. 4 is a block diagram showing an environment 400 including an enterprise with processes, tasks, and/or services, according to an exemplary embodiment. FIG. 4 is described in conjunction with FIG. 1, FIG. 2 and FIG. 3. FIG. 4 shows an environment 400 including the enterprise 102, for example, represented by the hospital ecosystem. The hospital ecosystem may include multiple factions that implement processes for delivering services related to healthcare to the end users. For example, the multiple factions may include a primary care clinic 402, an outpatient care 404 faction, an emergency response (ER) management (e.g., an emergency department 406) faction, a patient admissions management 408 faction, a marketing management 410 faction, a patient relationship management 412 faction, a billing 414 faction, a discharge 416 faction, a remote and home care providers management 418 faction, a revenue cycle management 420 faction, an insurance management 422 faction, a pricing 424 management faction, a costing 426 management faction, a cash flow management 428 faction, a service providers 430 faction, a procurement management 432 faction, a supply chain management 434 faction, a vendor management 436 faction, and an inventory management 438 faction. Each of the aforementioned factions may implement processes, tasks, and/or services that may operate or function independently or in cooperation, thereby providing a seamless healthcare delivery.

In an embodiment, other factions may implement processes, tasks, and/or services that may include a human resource (HR) 440 faction and a finance 442 faction which may work in cooperation with a costing 444 faction, general stores 446, and a pharmacy 448 to support additional processes, tasks, and/or services in the hospital. In an embodiment, the hospital may deliver healthcare services via an integrated healthcare system that may include multiple specializations. The processes, tasks, and/or services associated with the multiple specializations may be delivered or provided via respective wards 450. For example, such wards may include an orthopedics 452 ward, a nephrology 454 ward, a general medicine 456 ward, a cardiology 458 ward, a neurology 460 ward, a rheumatology 462 ward, and an endocrinology 464 ward. The services delivered or provided by each ward may include services, such as physician services 466, nursing services 468, radiology services 470, lab services 472, pantry services 474, biomedical services 476, and facilities and management services 478.

In an embodiment, the integrated system 304 may be deployed in the hospital ecosystem to derive insights, make decisions, drive engagement and actions to improve overall value or quality of the services delivered by the hospital. For instance, the integrated system 304 may be implemented in every ward and perform execution of the operations and/or functions, such as analyzing scenarios, performing predictive analysis and modeling, enterprise modeling, executing rules, continuous learning of data and information via automated and machine learning engines, generating or creating value graphs, augmenting SME knowledge with automated learning and machine learning engine in value graphs, and identifying opportunities for maximizing or optimizing the value of the healthcare delivery.

The integrated system 304 may create or generate value graphs that may provide insights and be represented by a measure of key performance indicator (KPI) associated with the processes, tasks, and/or services. The value graphs may be continually monitored and modified to improve the KPIs that may optimize metrics or values in the hospital ecosystem. The value graphs may provide insights and identify opportunities in the processes, tasks, and/or services for improving the healthcare delivery. Such improvements in the healthcare delivery may drive value for each stakeholder, shareholder, and the customer. The integrated system 304 may generate and provide visualizations, provide insights for determining or identifying opportunities or operational silos in the processes, tasks, and/or services, support making strategic decisions, drive activities to engage with various stakeholders associated with the processes, tasks, and/or services and maximize value of the healthcare delivery.

Figure 5A:
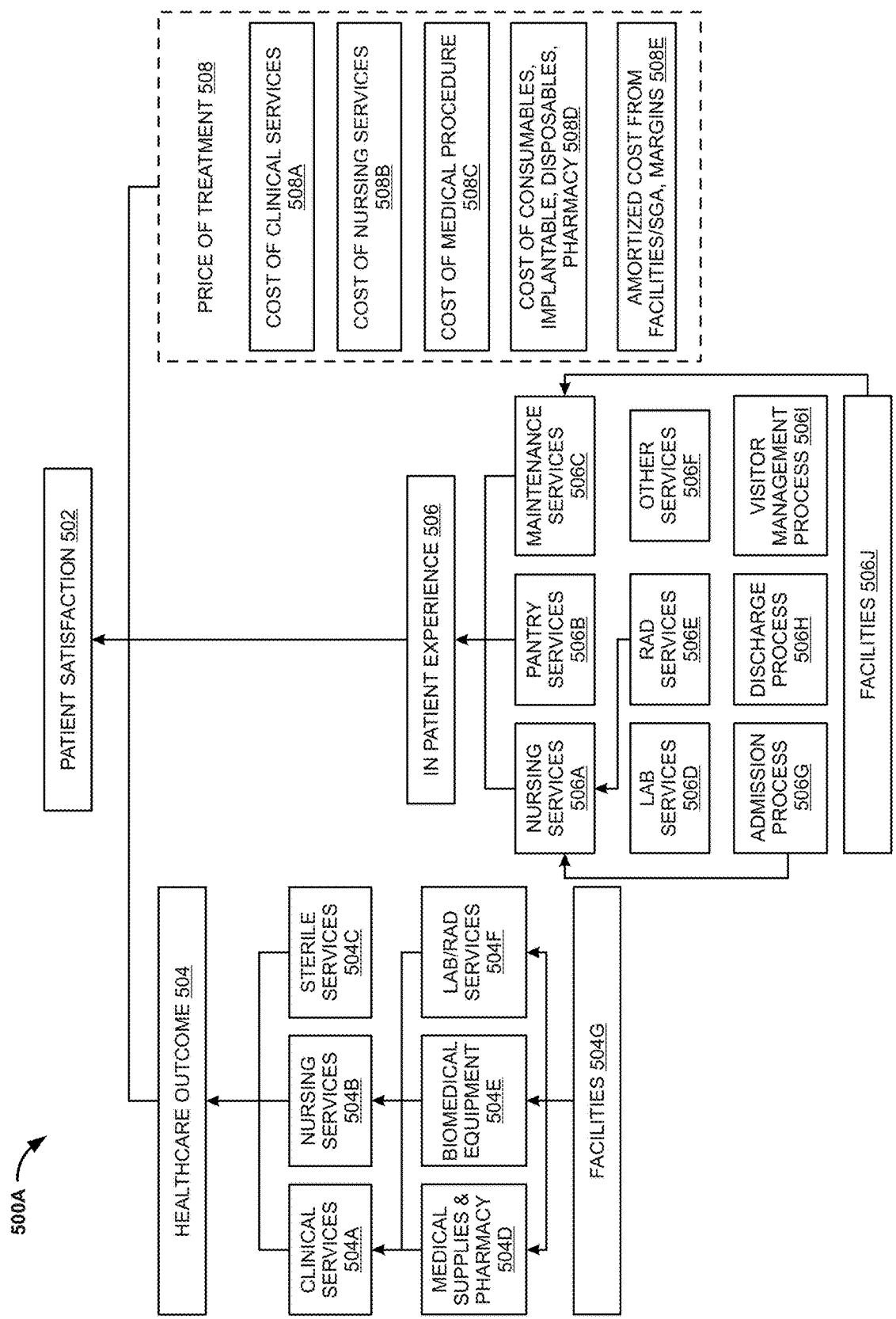
FIG. 5A is a diagram showing a value graph including connections between different factions in a hospital ecosystem, according to an exemplary embodiment.

FIG. 5A is a diagram showing a value graph 500A including connections between different factions in a hospital ecosystem, according to an exemplary embodiment.

FIG. 5A is described in conjunction with FIGS. 1-4. FIG. 5A shows a value graph 500 that includes connections between different factions implementing processes, tasks, and/or services that are delivered in the hospital ecosystem. A value graph 500A may provide multidimensional insights to determine or identify attributes or opportunities for managing processes, tasks, and/or services in the hospital. In an embodiment, the value graph may provide a single dimension or a multidimensional insight and may hereinafter be referred to as insights. The value graph 500A may provide insights to KPIs representing a measure of metrics associated with the processes, tasks, and/or services. The value graphs may either be created manually by the stakeholders or subject matter experts or be generated automatically by the cooperative execution of the operations by the engines, the models and the framework, as shown and described in FIG. 3. In an embodiment, measure of the metrics associated with the processes, tasks, and/or services is influenced by the end user experience consuming such services. For example, the end users may provide a feedback based on their experience with each process and/or service. Based on the feedback, the value graphs may be dynamically modified. Further the insights provided by the value graphs may be used to identify opportunities that may be optimized. Further, the value may be optimized by augmenting inputs of the SMEs knowledge from different wards or departments, factions and response of the analysis and learning of the automation engine 304H and the machine learning engine 304G. In an embodiment, value graph 500A may be generated by the integrated system 304 may be used to optimize the processes, tasks, and/or services at the hospital.

In an embodiment, the value graph 500A may further provide insights into process metrics that may be useful in determining or performing the root cause analysis (RCA) associated with the processes, tasks, and/or services. The value graph 500A may further provide insights into planning, analyzing different scenarios, making predictions based on such analysis, computation metrics, tracking engagements of the stakeholders and driving actions to maximize the KPIs and value delivered by the enterprise. The value graph 500A may also provide insights that may be useful to make strategic decisions, appropriate judgements and realign or modify the strategy for driving the value of the hospital ecosystem. The value graph 500A may be dynamically updated in response to an augmentation of feedback by the customers, SME knowledge and analysis by the automation engine 304H, the machine learning engine 304G, etc. Such real-time feedback may provide opportunities for identifying KPIs associated with processes, tasks, and/or services at the hospital and improving the identified KPIs to drive the customer value, the shareholder value, and the stakeholder value.

Referring to FIG. 5A, the value graph 500A is associated with a KPI that relates to a patient satisfaction 502. The measure of the KPI related to the patient satisfaction 502 may be dependent on, for example, a healthcare outcome 504, an in-patient experience 506, price of treatment 508, etc. The healthcare outcome 504 may be influenced by, for example, clinical services 504A, nursing services 504B, sterile services 504C, medical supplies and pharmacy 504D, biomedical equipment 504E, laboratory services, radiology services, (e.g., lab/rad services 504F) etc. The above influencing metrics may further depend on the infrastructure in the hospital supported by the facilities 504G. Further, the measure of KPI associated with the patient satisfaction 502 may be dependent on the factor, for example, an in-patient experience 506 that may further be influenced by parameters, such as nursing services 506A, pantry services 506B, maintenance services 506C, lab services 506D, rad services 506E, other services 506F, admission process 506G, discharge process 506H, visitor management process 506I, etc. The aforementioned influencing parameters may further depend on the infrastructure in the hospital supported by the facilities 504J.

Further, the measure of the KPI related to the patient satisfaction 502 may be dependent on, for example, the price of treatment 508 that may collectively be influenced by parameters, such as cost of clinical services 508A, cost of nursing services 508B, cost of medical procedures 508C, cost of consumables, implants, disposables, pharmacy 508D, amortized cost from facilities, sales, and general accounting (SGA), margins 508E, etc. The value graph 500 includes interconnections (shown by arrows) between the factors (e.g., 504, 506 and 508) and the corresponding influencing parameters and may represent a connection. The strength of each connection may be measured by a weight. The weights may be assigned manually or automatically. For example, the weight assignments may be dynamic based on the analysis and response to analysis by the engines (e.g., 304A through 304M). The weight assignment may change based on the patient feedback and may directly influence the KPI related to the patient satisfaction. The value graph 500A may therefore provide insights to such connections, weights, strengths of connections, etc.

Figure 5B:
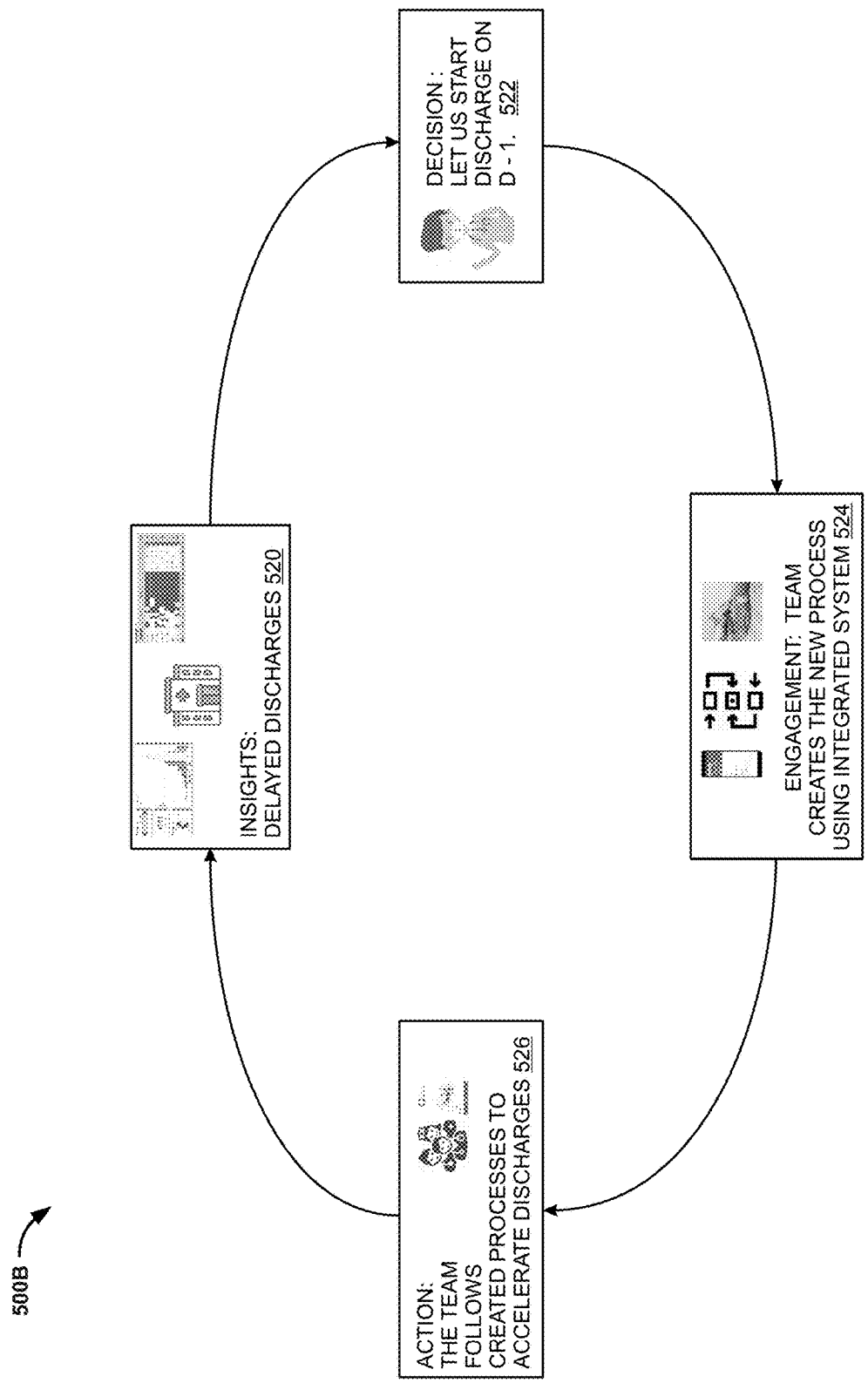
FIG. 5B is a block diagram showing an IDEA loop, in accordance with an exemplary embodiment.

FIG. 5B is a block diagram showing an IDEA loop 500B, in accordance with an exemplary embodiment. FIG. 5B is described in conjunction with FIG. 1, FIG. 2, and FIG. 3. FIG. 5B shows a loop 500B including insights, decisions, engagement, and action (IDEA), that may be referred to as an IDEA loop. The IDEA loop may facilitate a closed loop metric tracking. Referring to FIG. 3, the engines (e.g., 304A through 304M) may execute operations to facilitate "insights" to aid or support making strategic "decisions." The engines (e.g., 304N through 304U) may execute operations or functions to facilitate "engagement" that may drive "actions."

Referring to FIG. 5B, the engines (e.g., 304A through 304K) may execute operations to provision "insights". For example, the insight may correspond to KPI related to a patient discharge process in a hospital ecosystem. As shown, the block related to "Insights" 520 indicates that the patient discharge process was delayed. Based on this insight the stakeholder associated with the patient discharge process may be able to conclude or arrive at a decision that the patient discharge can be expedited by initiating the discharge process a day prior to the actual scheduled day for the patient discharge. As shown, the block related to "Decision" 522 indicates "Let us start discharge on D-1", where 'D' corresponds to the scheduled day of patient discharge. In an embodiment, the integrated system 304 may provision creating a new process that may include a checklist of tasks associated with each stakeholder associated with the patient discharge process. For example, the stakeholders associated with the patient discharge process may include services provided by the stakeholders, such as the physician services, the nursing services, the radiology services, the lab services, the pantry services, the biomedical services, the facilities and management services, the pharmacy services, etc. The integrated system 304 may provision creating checklists including the associated the tasks for each of the stakeholders providing the aforementioned services. As shown, the block related to "Engagement" 524 indicates "Team creates the new process using the integrated system," enables execution of the above process. Each stakeholder, for example, the physician services, the nursing services, the radiology services, the lab services, the pantry services, the biomedical services, the facilities and management services, the pharmacy services, etc., related to the patient discharge process may create checklist of processes including the tasks that may be completed to accelerate the patient discharge process.

In an embodiment, the integrated system 304 may notify the respective stakeholders associated with each task in the checklist that enables the respective stakeholders to take "Action." As shown, the block related to "Action" 526 indicates "The team follows created processes to accelerate discharges." When the respective stakeholders or employees complete each of the assigned tasks, the checklist may provision information on the completion and may accelerate the patient discharge process. In an embodiment, the integrated system 304 may process, analyze, and transform the data and provide insights for identifying opportunities that may be optimized. As described above, the patient discharge process was identified as an opportunity that was optimized to accelerate the patient discharge process, thereby amplifying the value associated with the KPI related to the patient satisfaction.

In an embodiment, the automation of the processes, tasks, and/or services supported with data analytics may provision strategic decision making with respect to one or more implemented processes and/or one or more services delivered by the hospital. Further, the engines and/or models of integrated system 304 as shown and described in FIG. 3 facilitates execution of operations or functions such as, making recommendations that are actionable and that drive value for the various stakeholders in the hospital ecosystem. Further tracking of actions across various stakeholders may provision closed loop feedback from data driven insights to actions that may optimize or increase driven value. The closed loop feedback may also be referred to as closed loop metric tracking that provides insights to metrics associated with the processes and/or service delivery.

Figure 6:
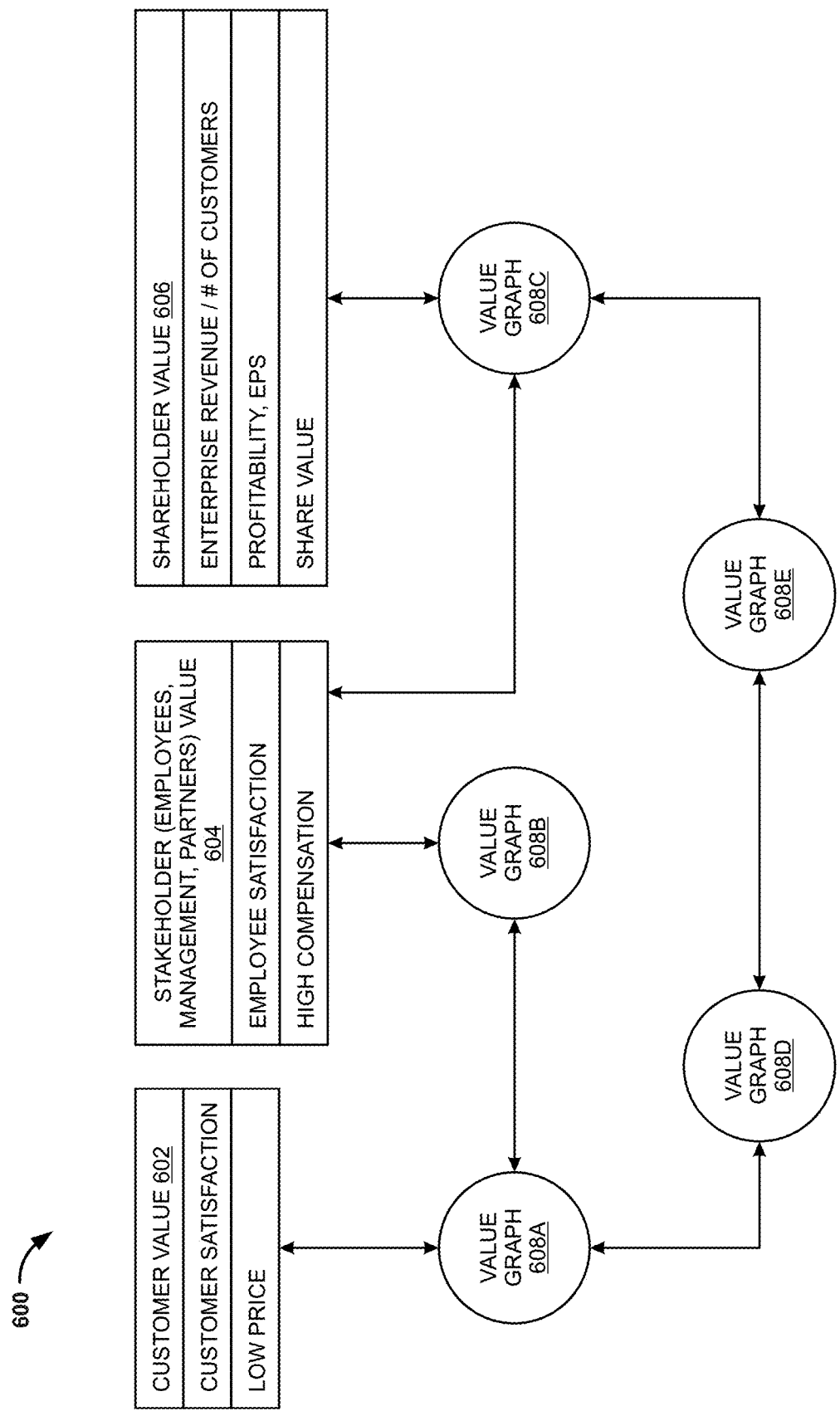
FIG. 6 is a block diagram showing a hierarchical arrangement of value graphs, according to an exemplary embodiment.

FIG. 6 is a block diagram showing a hierarchical arrangement 600 of value graphs, according to an exemplary embodiment. FIG. 6 is described in conjunction with FIGS. 5A and 5B. FIG. 6 shows an exemplary illustration of a hierarchical arrangement 600 of value graphs (e.g., 608A, 608B, 608C, 608D, and 608E) that may be modeled for the hospital ecosystem. The hierarchical arrangement 600 of the value graphs may provision insights to metrics or processes (e.g., values) that may be optimized or improvised for the end users. For example, the values associated with the end users may correspond to a customer value 602, a stakeholder value 604 and a shareholder value 606.

In an embodiment, the value graphs in FIG. 5A show interconnections between the various processes, tasks, and/or services in the hospital ecosystem. The value graphs may provision insights to KPIs or process metrics that provide means for measuring the quality of the delivery of the processes and/or delivery of the services. Referring to FIG. 6, an interconnection between the value graphs (e.g., 608A, 608B, 608C, 608D, and 608E) and the associated one or more processes, tasks, and/or services in the hospital ecosystem are shown. The value graphs (e.g., 608A, 608B, 608C, 608D, and 608E) may be arranged hierarchically and the output of the value graphs (e.g., 608A, 608B, 608C, 608D, and 608E) may influence other value graphs (e.g., 608A, 608B, 608C, 608D, and 608E). In an embodiment, the measure of KPIs associated with end user experiences who consume the processes, tasks, and/or services in the hospital may be impacted by the connections and the strength of the connections in the value graphs.

Figure 7:
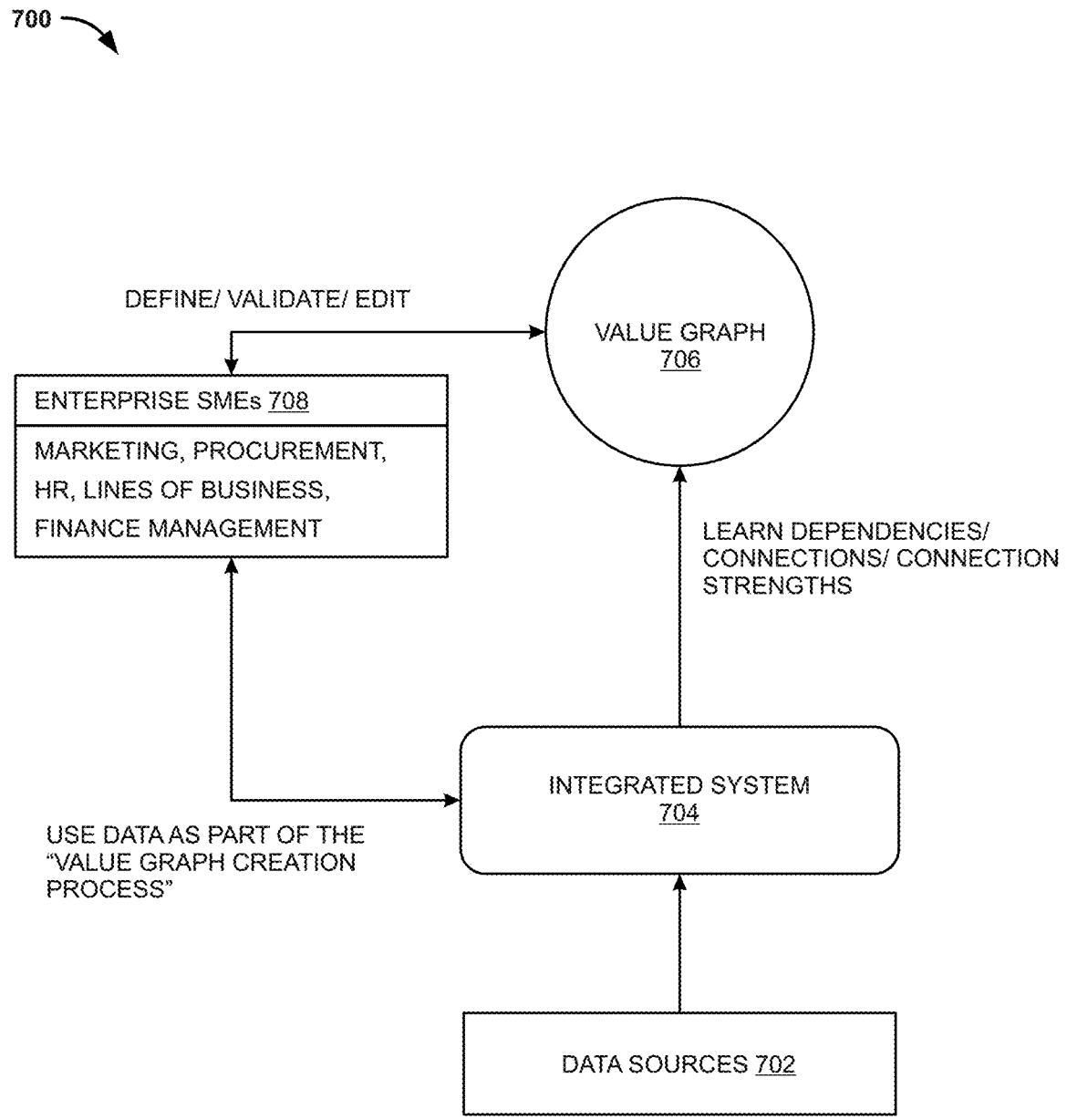
FIG. 7 is a block diagram showing a mechanism to create and dynamically modify a value graph, according to an exemplary embodiment.

FIG. 7 is a block diagram showing a mechanism 700 to create and dynamically modify a value graph, according to an exemplary embodiment. FIG. 7 is described in conjunction with FIGS. 1-3. FIG. 7 shows a system 700 including data sources 702, an integrated system 704, a value graph 706 and the information from external source, such as inputs from enterprise SME 708. The integrated system 704 is the same one as the integrated system 304, as shown and described in FIG. 3. In an embodiment, the integrated system 704 processes, analyzes and transforms data (e.g., execution of operations by the engines with reference to FIG. 3) from the data sources 702 and creates the value graph 706 that may be associated with the processes, services, tasks, etc., in the hospital ecosystem. The value graph 706 may be influenced by multiple factors that may directly or indirectly be associated with the processes, tasks, and/or services in the hospital.

In an embodiment, the engines and/or models in the integrated system 706 may execute operations to identify opportunities that may be associated with the processes, tasks, and/or services that may be optimized and drive value for the hospital ecosystem. Upon such identification, the factors associated with the identified opportunities may be dynamically modified. The factors influencing the identified opportunities may be modified based on the response to the analysis by the automation engine 304H, machine learning engine 304G, etc., in the integrated system 704. Further the factors influencing the identified opportunities may be modified by augmenting external knowledge or inputs, such as information or data related to SMEs (e.g., enterprise SMEs 708). In an embodiment, the dynamic modification may be implemented by using the data or information from the data sources 702 that may be referred to as the "Value Graph Creation Process."

Figure 8:
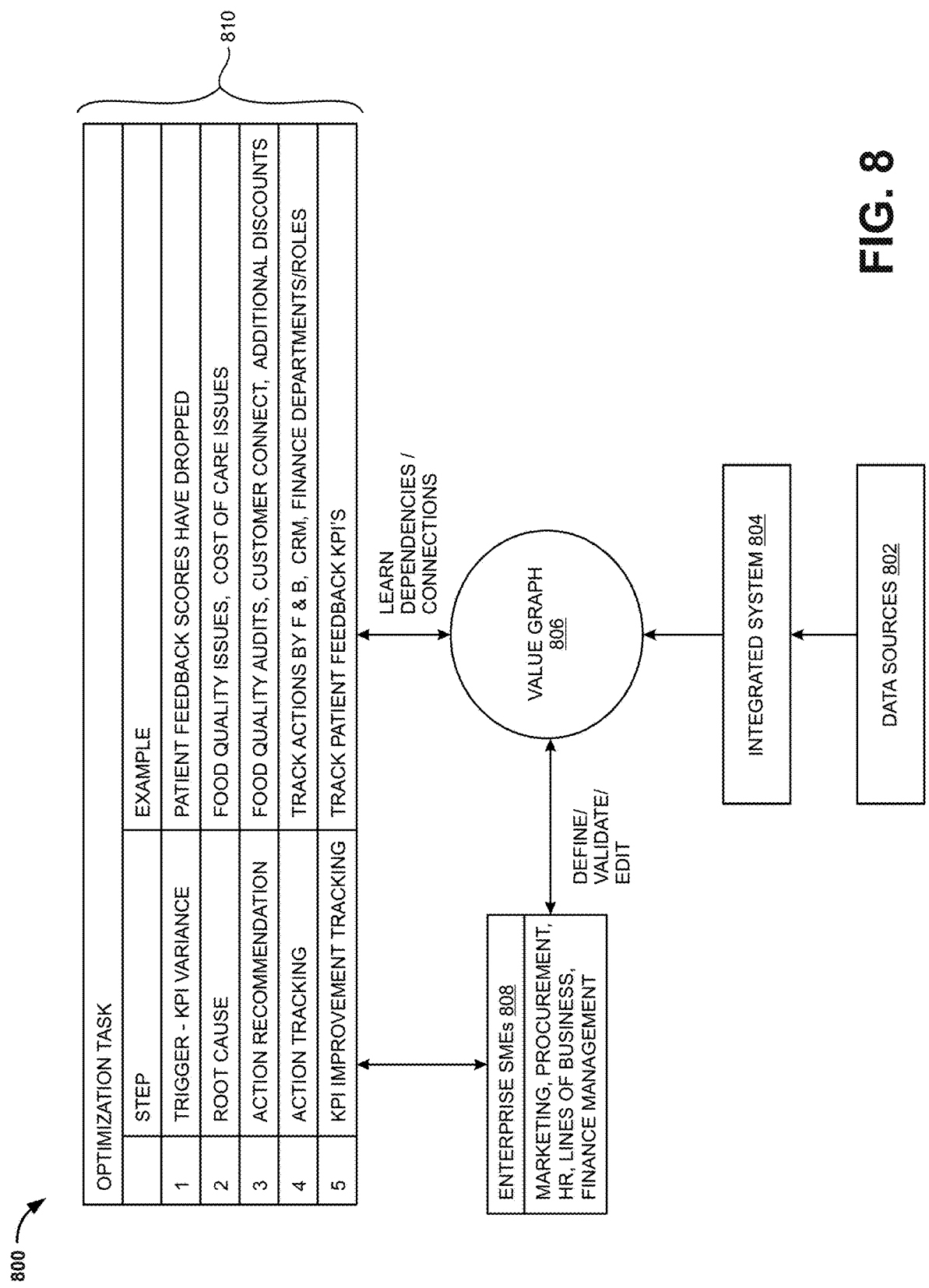
FIG. 8 is a block diagram showing an identification of opportunities that may be optimized in an enterprise, according to an exemplary embodiment.

FIG. 8 is a block diagram 800 showing an identification of opportunities 810 that may be optimized in an enterprise, according to an exemplary embodiment. FIG. 8 is described in conjunction with FIGS. 3, 5 and 7. FIG. 8 shows data sources 802, an integrated system 804, a value graph 806 and opportunities identified 810 that may be optimized for maximizing the value of the hospital ecosystem. The integrated system 804 is the same one as the integrated system 304, as shown and described in FIG. 3. the data from the data sources 802 may be processed, analyzed, and transformed by the integrated system 804, as described with reference to FIG. 3.

In an embodiment, the integrated system 804 may create or generate value graphs 806 associated with the processes, tasks, and/or services in the hospital. The value graphs 806 may provide insights to measure the KPIs associated with the processes, tasks, and/or services at the hospital. The value graphs 806 may be created and dynamically modified may be modified by augmenting external knowledge or inputs, such as information or data related to SMEs (e.g., enterprise SMEs 808), as described with reference to FIG. 7. Referring to FIG. 8, there is shown an exemplary block diagram 800 including list of opportunities 810 that are identified for optimization. In an embodiment, the list of identified opportunities 810 may he associated with the processes, tasks, and/or services at the hospital. The list of identified opportunities 810 may include measure of process metrics represented by influencing KPIs that may be used to optimize values in the hospital. In an embodiment the identified list of opportunities 810 may include metrics (shown as STEP in 810) that may be optimized and recommendations (shown as EXAMPLE in 810) driving the metrics.

Figure 9:
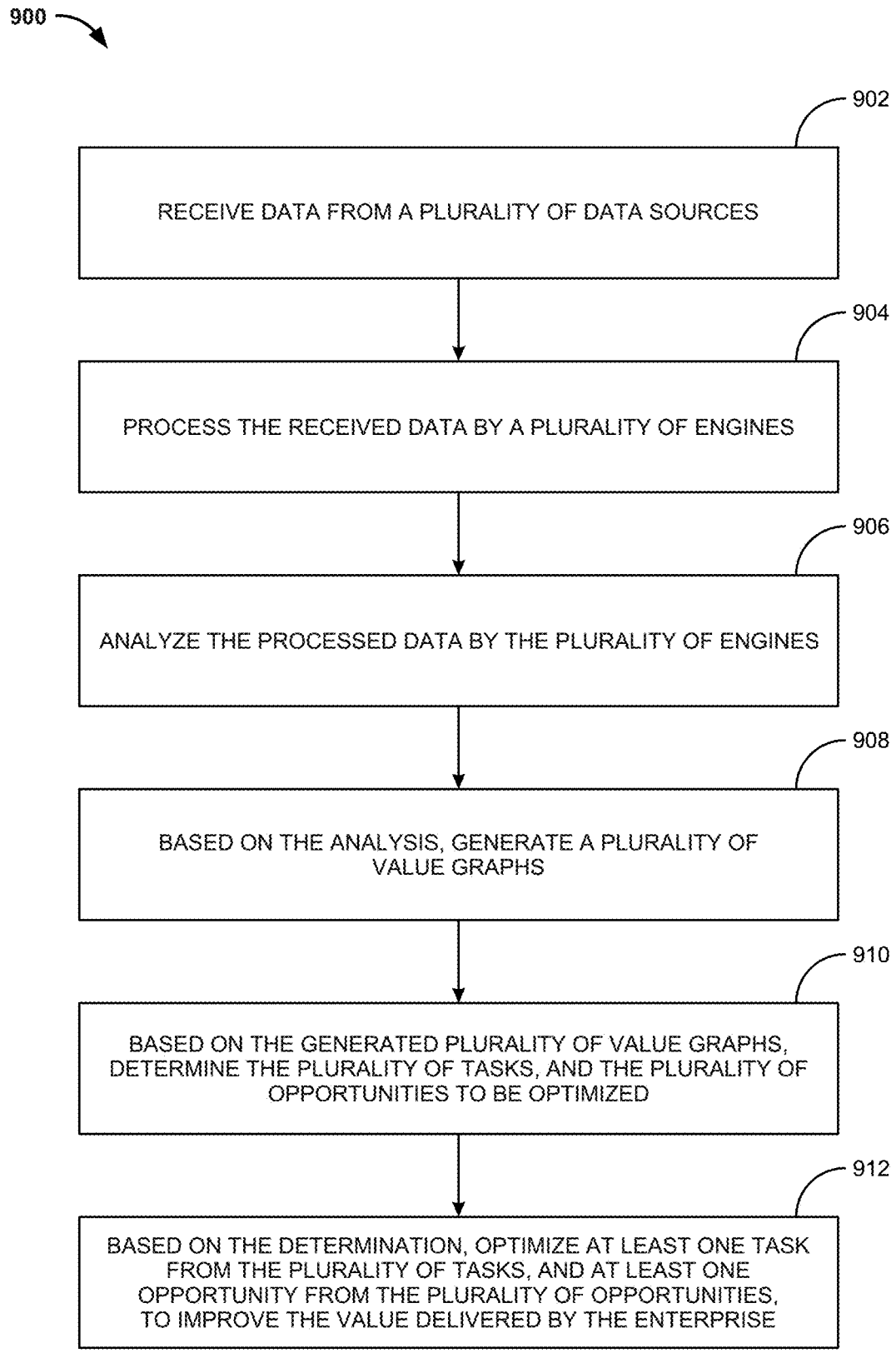
FIG. 9 is a flow diagram showing a process 900 to optimize a value delivered by an enterprise, according to an exemplary embodiment.

FIG. 9 is a flow diagram showing a process 900 to optimize a value delivered by an enterprise, according to an exemplary embodiment. FIG. 9 is described in conjunction with FIG. 3. At 902, data is received from a plurality of data sources. At step 904, the received data is processed by multiple engines. For example, the multiple engines correspond to the one that are shown and described in FIG. 3. At step 906, the processed data is analyzed by the multiple engines. At step 908, multiple value graphs is generated based on the analysis. The value graph may include a measure of the key performance indicator associated with multiple tasks and the processes. The multiple value graphs may include multiple connections and a corresponding weight. The multiple connections may represent multiple links between the multiple factors and a corresponding multiple parameters influencing the measure of KPI associated with the multiple the processes and the multiple tasks. At step 910, based on the analysis, the multiple tasks and multiple opportunities to be optimized are determined. At step 912, based on the determination, at least one task from the multiple tasks and at least one opportunity from the multiple opportunities is optimized. For example, optimization may correspond to maximization, improvisation, etc., that may drive the value delivered by the enterprise. The operational efficacies of the execution and embodiment of the process 900 namely steps 902, 904, 906, 908, 910 and 912 are as described with reference to FIG. 3.

Figure 10:
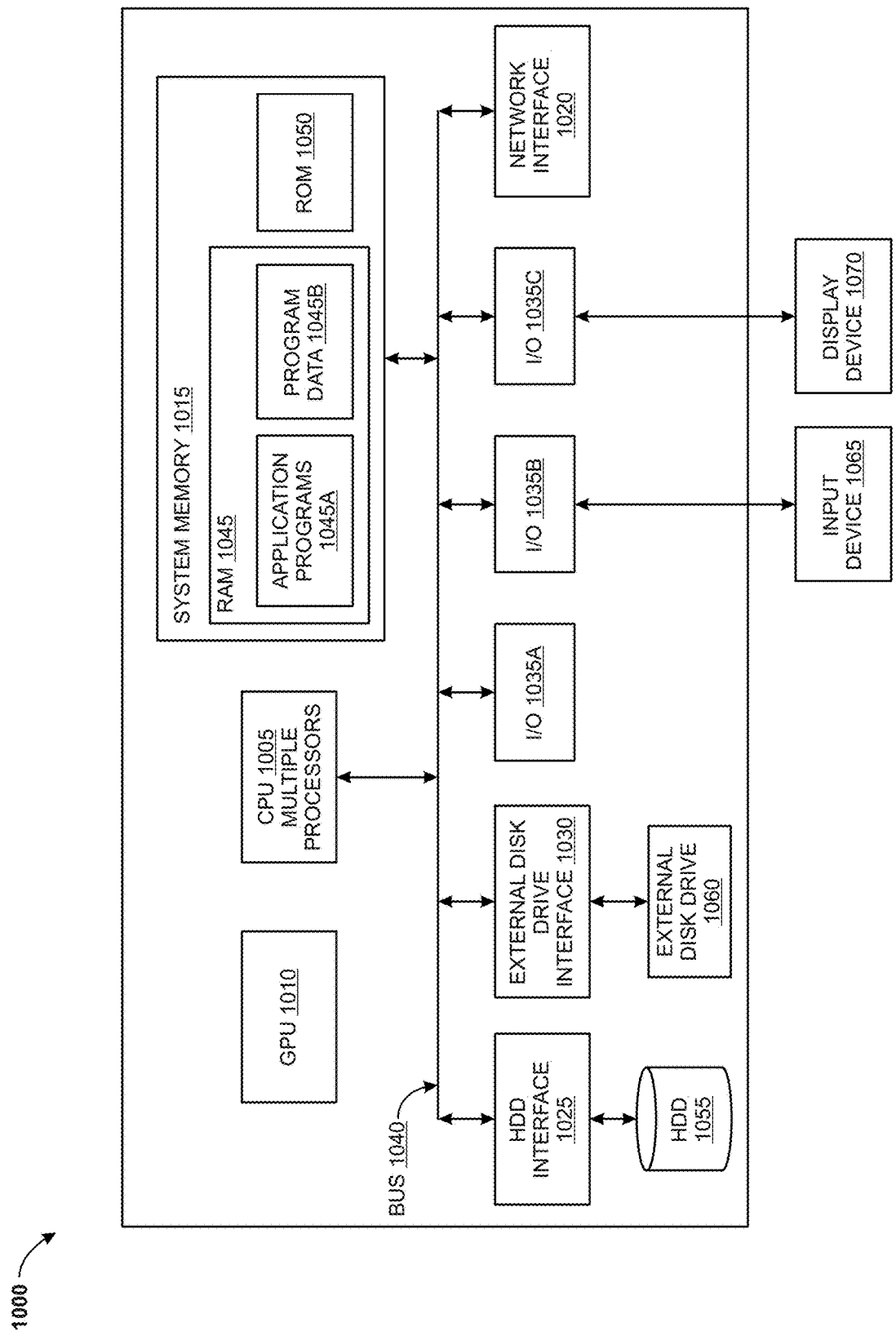
FIG. 10 shows an exemplary hardware configuration of computer that may be used to implement components of an integrated system for optimizing values of an enterprise, according to exemplary embodiments.

FIG. 10 shows an exemplary hardware configuration of computer 1000 that may be used to implement components of integrated system for optimizing values of an enterprise, in accordance with exemplary embodiments. The computer 1000 shown in FIG. 10 includes CPU 1005, GPU 1010, system memory 1015, network interface 1020, hard disk drive (HDD) interface 1025, external disk drive interface 1030 and input/output (I/O) interfaces 1035A, 1035B, 1035C. These elements of the computer are coupled to each other via system bus 1040. The CPU 1005 may perform arithmetic, logic and/or control operations by accessing system memory 1015. The CPU 1005 may implement the processors of the exemplary devices and/or system described above. The GPU 1010 may perform operations for processing graphic or AI tasks. In case computer 1000 is used for implementing exemplary central processing device, GPU 1010 may be GPU 1010 of the exemplary central processing device as described above. The computer 1000 does not necessarily include GPU 1010, for example, in case computer 600 is used for implementing a device other than central processing device. The system memory 1015 may store information and/or instructions for use in combination with the CPU 1005. The system memory 1015 may include volatile and non-volatile memory, such as random-access memory (RAM) 1045 and read only memory (ROM) 1050. A basic input/output system (BIOS) containing the basic routines that helps to transfer information between elements within the computer 1000, such as during start-up, may be stored in ROM 1050. The system bus 1040 may be any of several types of bus structures including a memory bus or memory controller, a peripheral bus, and a local bus using any of a variety of bus architectures.

The computer may include network interface 1020 for communicating with other computers and/or devices via a network.

Further, the computer may include hard disk drive (HDD) 1055 for reading from and writing to a hard disk (not shown), and external disk drive 1060 for reading from or writing to a removable disk (not shown). The removable disk may be a magnetic disk for a magnetic disk drive or an optical disk such as a CD ROM for an optical disk drive. The HDD 1055 and external disk drive 1060 are connected to the system bus 1040 by HDD interface 1025 and external disk drive interface 1030 respectively. The drives and their associated non-transitory computer-readable media provide non-volatile storage of computer-readable instructions, data structures, program modules and other data for the general-purpose computer. The relevant data may be organized in a database, for example a relational or object database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 1050, or RAM 1045, including an operating system (not shown), one or more application programs 1045A, other program modules (not shown), and program data 1045B. The application programs may include at least a part of the functionality as described above.

The computer 1000 may be connected to input device 1065 such as mouse and/or keyboard and display device 1070 such as liquid crystal display, via corresponding I/O interfaces 1035A to 1035C and the system bus 1040. In addition to an embodiment using a computer 1000 as shown in FIG. 10, a part or all the functionality of the exemplary embodiments described herein may be implemented as one or more hardware circuits. Examples of such hardware circuits may include but are not limited to: Large Scale Integration (LSI), Reduced Instruction Set Circuits (RISC), Application Specific Integrated Circuit (ASIC) and Field Programmable Gate Array (FPGA).

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. An integrated system to optimize processes, tasks and services being carried out by an enterprise, the integrated system comprising:
   a processor; and
   one or more memory devices communicatively coupled with the processor and storing instructions, for, when executed on the processor, causing the integrated system to:
      receive data from a plurality of data sources by a big data integration engine, wherein the data is related to the processes, tasks and services being carried out by a plurality of factions within the enterprise, wherein at least one of the plurality of sources includes an external source external to the enterprise;
      process the received data by a plurality of engines including a data de-identification and anonymization engine, a data security engine, a rules engine, a user management engine, and a scenario analysis engine, wherein the plurality of engines implement an industry modeling framework which models the processes, tasks and services, and wherein the modeling includes identifying the data associated with each of the processes, tasks and services being carried out by each of the plurality of factions within the enterprise;
      analyze the processed data by the plurality of engines, including analyzing technical process metrics associated with each faction of the plurality of factions within the enterprise to provide insights into the processes, tasks and services being carried out by each of the plurality of factions within the enterprise;
      train a machine learning engine based on the received data from the plurality of data sources and the identified data identified by the industry modeling framework, wherein the machine learning engine is trained to augment the data from the plurality of sources for generation of a plurality of value graphs;
      based on the analysis, generate, by the trained machine learning engine, the plurality of value graphs on a user interface, wherein each of the plurality of value graphs includes a key performance indicator node which includes a measure of a key performance indicator associated with the processes, tasks and services, and a plurality of other nodes representing factors upon which the key performance indicator node is dependent, wherein each of the plurality of value graphs displays a plurality of connections between nodes of a respective value graph, and a weight assigned to each connection of the plurality of connections indicating a strength of a respective connection between two nodes of the respective value graph, wherein the key performance indicator associated with the respective value graph represents a measure of the technical process metrics associated with the processes, tasks and services of the enterprise, and the plurality of value graphs provide insights into the technical process metrics, and wherein the plurality of connections represent a plurality of links between a plurality of factors and a corresponding plurality of parameters influencing the measure of the key performance indicator;
      based on the generated plurality of value graphs, determine a plurality of tasks, and a plurality of opportunities to be optimized;
      based on the determination, optimize at least one task from the plurality of tasks, and at least one opportunity from the plurality of opportunities, wherein the optimization improves the technical process metrics associated with the processes, tasks and services of the plurality of factions of the enterprise;
      re-train the machine learning engine based on modified data and information from the external source, wherein the modified data includes modifications in the identified data, wherein the modifications in the identified data is based on continually changing attributes associated with the processes, tasks and services of the plurality of factions of the enterprise; and
      modify, by the machine learning engine re-trained on the modified data, the plurality of value graphs, wherein the modification includes changes in one of the displayed plurality of connections or the assigned weight.

2. The integrated system of claim 1, wherein the processed data is analyzed by the plurality of engines including a predictive analysis and modeling engine, a scenario analysis engine, an analytics and visualization engine, a machine learning engine, an automation engine, an optimization engine, an intelligent decision making engine, a trend and anomaly engine, and a recommendation engine.

3. The integrated system of claim 1, wherein the plurality of value graphs provides a multidimensional insight to enable making one or more decisions to optimize at least one task from the plurality of tasks, and at least one opportunity from the plurality of opportunities, wherein the optimization improves the technical process metrics.

4. The integrated system of claim 1, wherein the industry modeling framework includes a value graph model, a rules model, a machine learning model, and an industry standards model.

5. The integrated system of claim 1, wherein the plurality of connections and the corresponding weight for each of the plurality of value graphs are modified dynamically:
   in response to the analysis of the processed data by the plurality of engines; or
   in response to an input by an end user.

6. The integrated system of claim 1, wherein the plurality of value graphs are arranged in a hierarchical arrangement based on the modeled enterprise.

7. The integrated system of claim 1, wherein the integrated system further comprises the instructions, when executed on the processor, further causing the integrated system to: instantiate a plurality of actions by a rules model based on a determination of a variation in the key performance indicator associated with the processes, tasks and services of the enterprise.

8. The integrated system of claim 1, wherein the integrated system further comprises the instructions, when executed on the processor, further causing the integrated system to
   filter and display specific information on a dashboard based on a role of a user of the integrated system, wherein the specific information is related to the key performance indicator associated with the processes, tasks and services in the enterprise.

9. A method to optimize processes, tasks and services being carried out by an enterprise, the method comprising:

receiving data from a plurality of data sources, wherein the data is related to the processes, tasks and services being carried out by a plurality of factions within the enterprise, wherein at least one of the plurality of sources includes an external source external to the enterprise;

processing the received data by a plurality of engines, wherein the plurality of engines implement an industry modeling framework which models the processes, tasks and services, and wherein the modeling includes identifying the data associated with each of the processes, tasks and services being carried out by each of the plurality of factions within the enterprise;

analyzing the processed data by the plurality of engines, including analyzing technical process metrics associated with each faction of the plurality of factions within the enterprise to provide insights into the processes, tasks and services being carried out by each of the plurality of factions within the enterprise;

training a machine learning engine based on the received data from the plurality of data sources and the identified data identified by the industry modeling framework, wherein the machine learning engine is trained to augment the data from the plurality of sources for generation of a plurality of value graphs;

based on the analysis, generating, by the trained machine learning engine, the plurality of value graphs on a user interface, wherein each of the plurality of value graphs includes a key performance indicator node which includes a measure of a key performance indicator associated with the processes, tasks and services, and a plurality of other nodes representing factors upon which the key performance indicator node is dependent, wherein each of the plurality of value graphs displays a plurality of connections between nodes of a respective value graph, and a weight assigned to each connection of the plurality of connections indicating a strength of a respective connection between two nodes of the respective value graph, wherein the key performance indicator associated with the respective value graph represents a measure of the technical process metrics associated with the processes, tasks and services of the enterprise and the plurality of value graphs provide insights into the technical process metrics, and wherein the plurality of connections represent a plurality of links between a plurality of factors and a corresponding plurality of parameters influencing the measure of the key performance indicator;

based on the generated plurality of value graphs, determining a plurality of tasks, and a plurality of opportunities to be optimized;

based on the determination, optimizing at least one task from the plurality of tasks, and at least one opportunity from the plurality of opportunities, wherein the optimization improves the technical process metrics associated with the processes, tasks and services of the plurality of factions of the enterprise;

re-training the machine learning engine based on modified data and information from the external source, wherein the modified data includes modifications in the identified data, wherein the modifications in the identified data is based on continually changing attributes associated with the processes, tasks and services of the plurality of factions of the enterprise; and modifying, by the machine learning engine re-trained on the modified data, the plurality of value graphs, wherein the modification includes changes in one of the displayed plurality of connections or the assigned weight.

10. The method of claim 9, further comprising: providing a multidimensional insight by the plurality of value graphs that enables making one or more decisions to optimize at least one task from the plurality of tasks, and at least one opportunity from the plurality of opportunities, wherein the optimization improves the technical process metrics.

11. The method of claim 9, further comprising: modeling the enterprise via the industry modeling framework.

12. The method of claim 11, wherein the industry modeling framework includes a value graph model, a rules model, a machine learning model, and an industry standards model.

13. The method of claim 9, further comprising: dynamically modifying the plurality of value graphs including the plurality of connections and the corresponding weight:
in response to the analysis of the processed data by the plurality of engines; or
in response to an input by an end user.

14. The method of claim 9, further comprising: arranging the plurality of value graphs hierarchically based on the modeled enterprise.

15. The method of claim 9, further comprising: instantiating a plurality of actions based on a determination of a variation in the key performance indicator associated with the processes, tasks and services of the enterprise.

16. A non-transitory computer-readable device having instructions stored thereon that, when executed by at least one computing device, cause the at least one computing device to perform operations comprising:

receiving data from a plurality of data sources, wherein the data is related to the processes, tasks and services being carried out by a plurality of factions within the enterprise, wherein at least one of the plurality of sources includes an external source external to the enterprise;

processing the received data by a plurality of engines, wherein the plurality of engines implement an industry modeling framework which models the processes, tasks and services, and wherein the modeling includes identifying the data associated with each of the processes, tasks and services being carried out by each of the plurality of factions within the enterprise;

analyzing the processed data by the plurality of engines, including analyzing technical process metrics associated with each faction of the plurality of factions within the enterprise to provide insights into the processes, tasks and services being carried out by each of the plurality of factions within the enterprise;

training a machine learning engine based on the received data from the plurality of data sources and the identified data identified by the industry modeling framework, wherein the machine learning engine is trained to augment the data from the plurality of sources for generation of a plurality of value graphs;

based on the analysis, generating, by the trained machine learning engine, the plurality of value graphs on a user interface, wherein each of the plurality of value graphs includes a key performance indicator node which includes a measure of a key performance indicator associated with the processes, tasks and services, and a plurality of other nodes representing factors upon which the key performance indicator node is dependent, wherein each of the plurality of value graphs displays a plurality of connections between nodes of a respective value graph, and a weight assigned to each connection of the plurality of connections indicating a strength of a respective connection between two nodes of the respective value graph, wherein the key performance indicator associated with the respective value graph represents a measure of the technical process metrics associated with the processes, tasks and services of the enterprise and the plurality of value graphs provide insights into the technical process metrics, and wherein the plurality of connections represent a plurality of links between a plurality of factors and a corresponding plurality of parameters influencing the measure of the key performance indicator;

based on the generated plurality of value graphs, determining a plurality of tasks, and a plurality of opportunities to be optimized;

based on the determination, optimizing at least one task from the plurality of tasks, and at least one opportunity from the plurality of opportunities, wherein the optimization improves the technical process metrics associated with the processes, tasks and services of the plurality of factions of the enterprise;

re-training the machine learning engine based on modified data and information from the external source, wherein the modified data includes modifications in the identified data, wherein the modifications in the identified data is based on continually changing attributes associated with the processes, tasks and services of the plurality of factions of the enterprise; and modifying, by the machine learning engine re-trained on the modified data, the plurality of value graphs, wherein the modification includes changes in one of the displayed plurality of connections or the assigned weight.

17. The non-transitory computer-readable device of claim 16, further comprising: providing a multidimensional insight by the plurality of value graphs to enable making one or more decisions to optimize at least one task from the plurality of tasks, and at least one opportunity from the plurality of opportunities, wherein the optimization improves the technical process metrics.

18. The non-transitory computer-readable device of claim 16, further comprising: modeling the enterprise via the industry modeling framework.

19. The non-transitory computer-readable device of claim 16, wherein the industry modeling framework includes a value graph model, a rules model, a machine learning model, and an industry standards model.

20. The non-transitory computer-readable device of claim 16, further comprising: dynamically modifying the plurality of value graphs including the plurality of connections and the corresponding weight:
in response to the analysis of the processed data by the plurality of engines; or
in response to an input by an end user.

* * * * *